(12) United States Patent
Chen et al.

(10) Patent No.: US 11,695,500 B2
(45) Date of Patent: Jul. 4, 2023

(54) COMMUNICATION METHOD, TERMINAL DEVICE, AND NETWORK DEVICE

(71) Applicant: HUAWEI TECHNOLOGIES CO., LTD., Shenzhen (CN)

(72) Inventors: Zheng Chen, Beijing (CN); Xu Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 224 days.

(21) Appl. No.: 17/094,821

(22) Filed: Nov. 11, 2020

(65) Prior Publication Data

US 2021/0067267 A1 Mar. 4, 2021

Related U.S. Application Data

(63) Continuation of application No. PCT/CN2019/085774, filed on May 7, 2019.

(30) Foreign Application Priority Data

May 11, 2018 (CN) .......................... 201810451024.7

(51) Int. Cl.
*H04L 1/00* (2006.01)
*H04L 5/00* (2006.01)

(52) U.S. Cl.
CPC .......... *H04L 1/0027* (2013.01); *H04L 1/0038* (2013.01); *H04L 5/0008* (2013.01);
(Continued)

(58) Field of Classification Search
CPC ... H04L 1/0027; H04L 1/0038; H04L 5/0008; H04L 1/0008; H04L 5/001; H04L 5/0046;
(Continued)

(56) References Cited

U.S. PATENT DOCUMENTS 9,031,016 B2 * 5/2015 Kim ........................ H04L 5/001
370/216
9,554,377 B2 * 1/2017 Yang ...................... H04L 5/0053
(Continued)

FOREIGN PATENT DOCUMENTS

CN 101883434 A 11/2010
CN 101998584 A 3/2011
(Continued)

OTHER PUBLICATIONS

Extended European Search Report issued in EP 19798905.6, dated Jun. 15, 2021, 10 pages.
(Continued)

*Primary Examiner* — Jae Y Lee
*Assistant Examiner* — Aixa A Guadalupe Cruz

(57) ABSTRACT

This application provides a communication method, including: receiving, by a terminal device, configuration information, where the configuration information is used to configure M component carriers, and M is a positive integer; determining, by the terminal device, N types of DCI sizes based on the configuration information; and if N is greater than a first threshold, determining, by the terminal device, Q types of DCI sizes, and detecting a downlink control channel in a first time unit based on the Q types of DCI sizes, where Q is less than or equal to the first threshold. According to the communication method provided in this application, a capability of detecting a DCI size by a terminal device can be fully used.

20 Claims, 6 Drawing Sheets

(52) U.S. Cl.
CPC .......... *H04L 1/0008* (2013.01); *H04L 5/0001* (2013.01); *H04L 5/0053* (2013.01)

(58) Field of Classification Search
CPC ... H04L 5/0094; H04L 1/0039; H04L 5/0053; H04L 5/0092; H04W 24/02
See application file for complete search history.

(56) References Cited

U.S. PATENT DOCUMENTS

| | | | |
|---|---|---|---|
| 2010/0034303 | A1 | 2/2010 | Damnjanovic et al. |
| 2012/0182950 | A1 | 7/2012 | Chung et al. |
| 2014/0086184 | A1 | 3/2014 | Guan et al. |
| 2014/0204813 | A1 | 7/2014 | Yang et al. |
| 2014/0341143 | A1 | 11/2014 | Yang et al. |
| 2020/0128565 | A1* | 4/2020 | Golitschek Edler Von Elbwart ........... H04L 5/001 |
| 2021/0112528 | A1* | 4/2021 | Lee ................. H04L 1/0072 |
| 2022/0039116 | A1* | 2/2022 | Takeda ............. H04W 24/08 |

FOREIGN PATENT DOCUMENTS

| | | |
|---|---|---|
| CN | 102264135 A | 11/2011 |
| CN | 102448037 A | 5/2012 |
| CN | 102577128 A | 7/2012 |
| CN | 102577218 A | 7/2012 |
| CN | 102714567 A | 10/2012 |
| CN | 102811495 A | 12/2012 |
| CN | 105763307 A | 7/2016 |
| CN | 106454694 A | 2/2017 |
| WO | 2016161656 A1 | 10/2016 |

OTHER PUBLICATIONS

Vivo,"Remaining details on DCI content and formats",3GPP TSG RAN WG1 Meeting #92 R1-1801533,Athens, Greece, Feb. 26-Mar. 2, 2018,Total 4 Pages.

Samsung,"DCI Contents and Formats",3GPP TSG RAN WG1 Meeting #92bis R1-1804372,Sanya, China, Apr. 16-20, 2018,Total 4 Pages.

Nokia,"On the alignment of DCI format sizes",3GPP TSG RAN WG1 Meeting #92bis R1-1804614,Sanya, China, Apr. 16-Apr. 20, 2018,Total 5 Pages.

Office Action issued in CN202110686761.7, dated Apr. 27, 2022, 5 pages.

Yu-chun Wu et al., A New Downlink Control Channel Scheme for LTE. 2013 IEEE 77th Vehicular Technology Conference (VTC Spring), Jan. 2, 2014, 6 pages.

Hou Ruifeng, Research on Uplink Carrier Aggregation in LTE-Advanced System. Wuhan Research Institute of Posts and Telecommunications, Apr. 15, 2015, 2 pages.

Notice of Allowance issued in 202110686761.7, dated Oct. 10, 2022, 5 pages.

\* cited by examiner

COMMUNICATION METHOD, TERMINAL DEVICE, AND NETWORK DEVICE

CROSS-REFERENCE TO RELATED APPLICATIONS

This application is a continuation of International Application No. PCT/CN2019/085774, filed on May 7, 2019, which claims priority to Chinese Patent Application No. 201810451024.7, filed on May 11, 2018, The disclosures of the aforementioned applications are hereby incorporated by reference in their entireties.

TECHNICAL FIELD

Embodiments of this application relate to the communications field, and more specifically, to a communication method, a terminal device, and a network device.

BACKGROUND

In a next-generation communications system, when detecting a physical downlink control channel (PDCCH), a terminal device needs to perform detection for a plurality of times. As search space sets configured by a network device and quantities of different DCI sizes increase, complexity of detecting the PDCCH by the terminal device increases.

To limit a quantity of detection times of the terminal device, in a slot of a component carrier (CC) unit, a maximum quantity of different downlink control information sizes (DCI size) detected by the terminal device is preset. A quantity of different DCI sizes detected by the terminal device on a CC on which cross-component-carrier scheduling is configured may exceed a specified quantity of different DCI sizes detected by the terminal device on the CC.

To ensure that the quantity of different DCI sizes detected by the terminal device on the CC on which the cross-component-carrier scheduling is configured does not exceed the specified maximum quantity of different DCI sizes detected by the terminal device on the CC, for a DCI format (format) (for example, a DCI format 1_1), a quantity of bits are padded to all different DCI sizes having the DCI format, so that DCI sizes obtained after the bits are padded are equal to a largest DCI size in all the DCI sizes. According to an existing method, a relatively large quantity of bits may be padded. Consequently, resources are wasted, overall system performance is affected, and a capability of detecting a DCI size by the terminal device cannot be fully used.

SUMMARY

Embodiments of this application provides a communication method and a communications apparatus, so that a capability of detecting a DCI size by a terminal device can be fully used.

According to a first aspect, a communication method is provided, including: A terminal device receives configuration information. The configuration information is used to configure M component carriers, and M is a positive integer. The terminal device determines N types of DCI sizes based on the configuration information. If N is greater than a first threshold, the terminal device determines Q types of DCI sizes, and detects a downlink control channel in a first time unit based on the Q types of DCI sizes, where Q is less than or equal to the first threshold.

Optionally, M may be 1 or may be a positive integer greater than 1, for example, may be 2 or 4.

According to the communication method in this embodiment of this application, the terminal device is enabled to determine the Q types of DCI sizes, and detect the downlink control channel in the first time unit based on the Q types of DCI sizes, where Q is less than or equal to the first threshold, so that a capability of detecting a DCI size by the terminal device can be fully used.

It should be understood that the first threshold is a maximum quantity of DCI sizes that can be detected by the terminal device in one time unit. The terminal device may determine, based on the configuration information, configuration information of a component carrier and a DCI format that needs to be detected on the component carrier. The N types of DCI sizes can be determined based on the DCI format and the configuration information of the component carrier.

Optionally, in some embodiments, the first threshold is predefined by a network system, or may be predefined in a protocol or a standard.

Optionally, in some other embodiments, the first threshold is configured by using higher layer signaling.

Optionally, in some other embodiments, the first threshold is determined by a network device based on capability information that is reported by the terminal device and that is used to detect a quantity of DCI sizes, for example, detect a maximum quantity of DCI sizes on one component carrier.

Optionally, in some other embodiments, the first threshold is a maximum quantity of sizes of one or more DCI formats that can be detected by the terminal device in one time unit, and both the N types of DCI sizes and the Q types of DCI sizes are types of the sizes of the one or more DCI formats. For example, the one or more DCI formats may be a DCI format 0_1 and/or a DCI format 1_1. In the some optional embodiments, both N and Q are values corresponding to a quantity of sizes of the one or more DCI formats. Optionally, the one or more DCI formats are the DCI format 0_1 and the DCI format 1_1. Further, optionally, in the some embodiments, a value of the first threshold may be $N_{max}-X$, and X is a type of sizes of DCI formats other than the one or more DCI formats in DCI formats determined by the terminal device based on the configuration information of the M carriers, $N_{max}$ is a maximum quantity of types of DCI sizes that is of the downlink control channel and that can be detected by the terminal device in one time unit.

How to determine the first threshold is not limited in this application, and the first threshold may be determined by using any determining method provided in the prior art.

It should be understood that the configuration information may be one piece of configuration information or a plurality of pieces of configuration information. In other words, the network device may send the configuration information once or may send the configuration information for a plurality of times to indicate information related to the terminal device.

It should be understood that the first time unit may be understood as a slot.

It should be understood that the component carrier may be a component carrier on which cross-component-carrier scheduling is configured, or may be a single component carrier. This is not limited in this application. The first threshold may be configured for the component carrier that supports the cross-component-carrier scheduling, or configured for a component carrier that does not support the cross-component-carrier scheduling, or configured for both the component carrier that supports the cross-component-carrier scheduling and the component carrier that does not support the cross-component-carrier scheduling. This is not specifically limited herein, and depends on a specific communication scenario and a system requirement.

With reference to the first aspect, in an implementation of the first aspect, that the terminal device determines Q types of DCI sizes further includes: The terminal device determines the Q types of DCI sizes from the N types of DCI sizes. The N types of DCI sizes correspond to the M component carriers, and the Q types of DCI sizes correspond to a portion of the M component carriers. The portion of the M component carriers described herein are a proper subset of a set formed by the M component carriers, to be specific, the portion of the M component carriers are one or more of N component carriers, but cannot be all the M component carriers.

According to the communication method in this embodiment of this application, the terminal device may determine the Q types of DCI sizes based on a portion of the M component carriers corresponding to the N types of DCI sizes, so that a method for detecting the downlink control channel by the terminal device can be determined.

Because there is a correspondence between a component carrier and a DCI size, a corresponding DCI size can be further determined based on the component carrier.

With reference to the first aspect and the foregoing implementation of the first aspect, in another implementation of the first aspect, that detect a downlink control channel in a first time unit includes: The terminal device detects the downlink control channel in search spaces of the portion of the M component carriers based on the Q types of DCI sizes. The search spaces are determined based on carrier numbers of the portion of the M component carriers and a search space set configured for the portion of the M component carriers.

According to the communication method in this embodiment of this application, corresponding search spaces may be determined based on the carrier numbers of the portion of the M component carriers and the search space set configured for the portion of the M component carriers, so that the terminal device can be indicated to detect a DCI format in a determined space of a component carrier.

With reference to the first aspect and the foregoing implementations of the first aspect, in another implementation of the first aspect, that detect a downlink control channel in a first time unit further includes: The terminal device skips detecting the downlink control channel in search spaces of component carriers corresponding to the (N-Q) types of DCI sizes. Optionally, the search spaces are determined based on carrier numbers corresponding to the (N-Q) types of DCI sizes and a search space set of the component carriers corresponding to the (N-Q) types of DCI sizes, where the (N-Q) types of DCI sizes are in the N types of DCI sizes, other than the Q types of DCI sizes.

According to the communication method in this embodiment of this application, search spaces that do not need to be detected by the terminal device can be determined based on the carrier numbers and the search space set of the component carriers corresponding to the (N-Q) types of DCI sizes.

With reference to the first aspect and the foregoing implementations of the first aspect, in another implementation of the first aspect, that detect a downlink control channel in a first time unit includes: The terminal device detects the downlink control channel in search spaces of the M component carriers based on the Q types of DCI sizes.

According to the communication method in this embodiment of this application, the terminal device may detect, based on the Q types of DCI sizes, the downlink control channel in the search spaces of all the component carriers configured by the configuration information.

With reference to the first aspect and the foregoing implementations of the first aspect, in another implementation of the first aspect, that the terminal device determines the Q types of DCI sizes includes: The terminal device determines the Q types of DCI sizes from the N types of DCI sizes.

According to the communication method in this embodiment of this application, the Q types of DCI sizes may be determined, based on a predetermined rule, from the N types of DCI sizes determined based on the configuration information. Optionally, the predetermined rule may be pre-agreed on by the network device and the terminal device, or may be configured by a communications system, or defined in a protocol or a standard, or defined in another possible manner. This is not specifically limited herein.

With reference to the first aspect and the foregoing implementations of the first aspect, in another implementation of the first aspect, that detect a downlink control channel in a first time unit includes: The terminal device detects, based on a DCI size $a_2$, the downlink control channel in search spaces of a component carrier corresponding to a DCI size $a_1$. The DCI size $a_1$ is one of the N types of DCI sizes, other than the Q types of DCI sizes, and the DCI size $a_2$ is in the Q types of DCI sizes, is greater than or equal to $a_1$, and has a smallest difference from $a_1$.

The search spaces of the component carrier corresponding to the DCI size $a_1$ is determined based on a component carrier number corresponding to the DCI size $a_1$ and a search space set configured for the component carrier corresponding to the DCI size $a_1$.

It should be understood that the DCI size $a_1$ may be any one of the N types of DCI sizes, other than the Q types of DCI sizes.

According to the communication method in this embodiment of this application, the terminal device can detect, based on the determined Q types of DCI sizes, the downlink control channel in search spaces of a component carrier corresponding to a DCI size other than the Q types of DCI sizes in the N types of DCI sizes.

With reference to the first aspect and the foregoing implementations of the first aspect, in another implementation of the first aspect, the Q types of DCI sizes are Q types of DCI sizes with largest values of DCI sizes in the N types of DCI sizes.

According to the communication method in this embodiment of this application, the Q types of DCI sizes with largest values of DCI sizes in the N types of DCI sizes may be directly selected for selection of the Q types of DCI sizes, so that the Q types of DCI sizes can be simply and quickly determined.

The selecting Q types of DCI sizes with largest values of DCI sizes may be selecting last Q types of DCI sizes after the N types of DCI sizes are sorted in ascending order of the DCI sizes, or selecting first Q types of DCI sizes after the N types of DCI sizes are sorted in descending order of the DCI sizes.

With reference to the first aspect and the foregoing implementations of the first aspect, in another implementation of the first aspect, the communication method further includes:

The terminal device determines a difference between two types of adjacent DCI sizes in the N types of DCI sizes sorted in ascending order, where the difference is used to determine the Q types of DCI sizes.

According to the communication method in this embodiment of this application, the Q types of DCI sizes may be selected based on the difference between two types of adjacent DCI sizes in the N types of DCI sizes, so that a quantity of bits that need to be padded can be reduced.

With reference to the first aspect and the foregoing implementations of the first aspect, in another implementation of the first aspect, that detect a downlink control channel in a first time unit further includes: The terminal device detects, based on a DCI size $a_2$, the downlink control channel in search spaces of a component carrier corresponding to a DCI size $a_1$. The DCI size $a_1$ is one of the N types of DCI sizes, and the DCI size $a_2$ is in the Q types of DCI sizes, is greater than or equal to $a_1$, and has a smallest difference from $a_1$.

The search spaces of the component carrier corresponding to the DCI size $a_1$ is determined based on a component carrier number corresponding to the DCI size $a_1$ and a search space set configured for the component carrier corresponding to the DCI size $a_1$.

It should be understood that the DCI size $a_1$ may be any one of the N types of DCI sizes.

With reference to the first aspect and the foregoing implementations of the first aspect, in another implementation of the first aspect, that the terminal device determines Q types of DCI sizes further includes: sequentially removing (N−Q) types of DCI sizes from the N types of DCI sizes, where the DCI size selected at an $m^{th}$ time meets that: the DCI size selected at the $m^{th}$ time is one of the (N−m+1) DCI sizes that are not selected before the $m^{th}$ selection;

the DCI size selected at the $m^{th}$ time allows a sum of overheads of all DCI sizes in a DCI size set including DCI sizes selected at first m times to be a smallest value of sums of DCI size overheads of all the DCI sizes separately included in (N−m+1) DCI size sets that are formed during the $m^{th}$ selection and that are formed by using each of the (N−m+1) DCI sizes as a DCI size selected at the $m^{th}$ time; and a DCI size overhead in a DCI size set is a smallest value of differences between a DCI size in the DCI size set and (N−m) DCI sizes that are in the N types of DCI sizes and that are other than m DCI sizes included in the DCI size set.

According to the communication method in this embodiment of this application, a remaining DCI size is selected each time.

With reference to the first aspect and the foregoing implementations of the first aspect, in another implementation of the first aspect, the Q types of DCI sizes meet one or more of the following conditions: the Q types of DCI sizes are predefined; the Q types of DCI sizes are determined based on a largest value and/or a smallest value of the N types of DCI sizes; and the Q types of DCI sizes are in an arithmetic progression. That the Q types of DCI sizes are in an arithmetic progression includes that: a first item of the arithmetic sequence is the first DCI size of the N types of DCI sizes sorted in ascending order, and a common difference of the arithmetic sequence is $d=[(a_N-a_1)/(N-1)]$.

With reference to the first aspect and the foregoing implementations of the first aspect, in another implementation of the first aspect, that the terminal device determines Q types of DCI sizes includes: determining the Q types of DCI sizes based on (N−Q) iterations. For an $n^{th}$ iteration, a sequence that is of m types of DCI sizes sorted in ascending order and that is obtained in an $(n-1)^{th}$ iteration is $a_1$, $a_2, \ldots a_m$, where n is greater than or equal to 2 and less than or equal to N−Q−1, and a value of m is N−n+1. First coefficients of the DCI sizes $a_1, a_2, \ldots a_m$ are respectively $p_1, p_2, \ldots p_{m-1}, p_m$, and second coefficients of DCI sizes $a_1$, $a_2, \ldots a_m$ are respectively $k_1, k_2, \ldots k_{n-1}$. For the second coefficient $k_i$, $k_i=a_{i+1}-a_i$, i is greater than or equal to 1 and less than or equal to m−1. The terminal device selects the DCI size $a_i$ from the sequence $a_1, a_2, \ldots a_m$ based on a minimum value $k_i p_i$ in a sequence $k_1 p_1, k_2 p_2, \ldots k_{m-1} p_{m-1}$ and the corresponding DCI size $a_i$. For an $(n+1)^{th}$ iteration, obtained (m−1) types of DCI sizes do not include $a_i$, and a sequence of (m−1) types of DCI sizes sorted in ascending order is: $a_1, a_2, \ldots, a_{i-1}, a_{i+1}, \ldots, a_m$, where a second coefficient of $a_{i-1}$ is $k_{i+1}+k_i$, and a second coefficient of another element in the sequence is the same as that in the $n^{th}$ iteration. The first coefficient of $a_{i+1}$ is $p_{i+1}+p_i$, and the first coefficient of another element in the sequence is the same as that in the $n^{th}$ iteration. The Q types of DCI sizes are obtained in an $(N-Q)^{th}$ iteration.

With reference to the first aspect and the foregoing implementations of the first aspect, in another implementation of the first aspect, the determining the Q types of DCI sizes based on (N−Q) iterations includes that: for a first iteration, a sequence of the N types of DCI sizes sorted in ascending order is $a_1, a_2, \ldots a_n$. The terminal device determines, based on the configuration information, a quantity of DCI sizes corresponding to each type of DCI sizes, and uses a value of the quantity of the DCI sizes as a first coefficient of the DCI size.

According to a second aspect, a communication method is provided, including: A network device determines configuration information of M component carriers. The network device sends the configuration information to a terminal device. The network device sends a downlink control channel in a first time unit based on Q types of DCI sizes, where Q is less than or equal to a first threshold. Types of DCI sizes configured by the network device for the M component carriers are N, and N is greater than the first threshold.

According to the communication method in this embodiment of this application, the network device is enabled to send the downlink control channel in the first time unit based on the Q types of DCI sizes, where Q is less than or equal to the first threshold, so that the terminal device can be indicated to fully use a capability of the terminal device to detect a DCI size.

With reference to the second aspect, in an implementation of the second aspect, the Q types of DCI sizes are included in the N types of DCI sizes, the N types of DCI sizes correspond to the M component carriers, and component carriers corresponding to the Q types of DCI sizes are a portion of the M component carriers.

With reference to the second aspect and the foregoing implementation of the second aspect, in another implementation of the second aspect, that the network device sends a downlink control channel in a first time unit based on Q types of DCI sizes includes: The network device sends, based on the Q types of DCI sizes, the downlink control channel on resources corresponding to search spaces of the portion of the M component carriers.

According to the communication method in this embodiment of this application, the network device may send the downlink control channel only on the resources corresponding to the search spaces of the portion of the M component carriers, so as to save resources.

With reference to the second aspect and the foregoing implementations of the second aspect, in another implementation of the second aspect, that the network device sends a downlink control channel in a first time unit based on Q types of DCI sizes includes: The network device sends, based on the Q types of DCI sizes, the downlink control channel on resources corresponding to search spaces of the M component carriers.

According to the communication method in this embodiment of this application, the network device can send, based on the Q types of DCI sizes, the downlink control channel on the resources corresponding to the search spaces of the M component carriers.

With reference to the second aspect and the foregoing implementations of the second aspect, in another implementation of the second aspect, the Q types of DCI sizes are Q types of DCI sizes in the N types of DCI sizes. According to the communication method in this embodiment of this application, Q types of DCI sizes with largest DCI sizes in the N types of DCI sizes may be directly selected for selection of the Q types of DCI sizes, so that the Q types of DCI sizes can be simply and quickly determined.

With reference to the second aspect and the foregoing implementations of the second aspect, in another implementation of the second aspect, that the network device sends a downlink control channel in a first time unit based on Q types of DCI sizes includes: The network device sends, based on a DCI size $a_2$, the downlink control channel on resources corresponding to search spaces of a component carrier corresponding to the DCI size $a_1$. The DCI size $a_1$ is one of the N types of DCI sizes, other than the Q types of DCI sizes, and the DCI size $a_2$ is in the Q types of DCI sizes, is greater than or equal to $a_1$, and has a smallest difference from $a_1$.

According to the communication method in this embodiment of this application, the Q types of DCI sizes may be selected based on the difference between two types of adjacent DCI sizes in the N types of DCI sizes, so that a quantity of bits that need to be padded can be reduced.

With reference to the second aspect and the foregoing implementations of the second aspect, in another implementation of the second aspect, the Q types of DCI sizes are Q types of DCI sizes with largest values of DCI sizes in the N types of DCI sizes.

According to the communication method in this embodiment of this application, a quantity of bits are padded to a DCI size in the N types of DCI sizes, so that the Q types of DCI sizes are obtained after the quantity of bits are padded to the N types of DCI sizes, and a plurality of methods for determining the Q types of DCI sizes are provided.

With reference to the second aspect and the foregoing implementations of the second aspect, in another implementation of the second aspect, that the network device sends a downlink control channel in a first time unit based on Q types of DCI sizes includes: The network device sends, based on a DCI size $a_2$, the downlink control channel on resources corresponding to search spaces of a component carrier corresponding to the DCI size $a_1$. The DCI size $a_1$ is one of the N types of DCI sizes, and the DCI size $a_2$ is in the Q types of DCI sizes, is greater than or equal to $a_1$, and has a smallest difference from $a_1$.

With reference to the second aspect and the foregoing implementations of the second aspect, in another implementation of the second aspect, the Q types of DCI sizes include: sequentially removing (N−Q) types of DCI sizes from the N types of DCI sizes, where the DCI size selected at an $m^{th}$ time meets that: the DCI size selected at the $m^{th}$ time is one of the (N−m+1) DCI sizes that are not selected before the $m^{th}$ selection; the DCI size selected at the $m^{th}$ time allows a sum of overheads of all DCI sizes in a DCI size set including DCI sizes selected at first m times to be a smallest value of sums of DCI size overheads of all the DCI sizes separately included in (N−m+1) DCI size sets that are formed during the $m^{th}$ selection and that are formed by using each of the (N−m+1) DCI sizes as a DCI size selected at the $m^{th}$ time; and a DCI size overhead in a DCI size set is a smallest value of differences between a DCI size in the DCI size set and (N−m) DCI sizes that are in the N types of DCI sizes and that are other than m DCI sizes included in the DCI size set.

With reference to the second aspect and the foregoing implementations of the second aspect, in another implementation of the second aspect, the Q types of DCI sizes meet one or more of the following conditions: the Q types of DCI sizes are predefined; the Q types of DCI sizes are determined based on a largest value and/or a smallest value of the N types of DCI sizes; and the Q types of DCI sizes are in an arithmetic progression.

According to a third aspect, a terminal device is provided, including: a receiving unit, configured to receive configuration information, where the configuration information is used to configure M component carriers, and M is a positive integer; and a processing unit, configured to determine N types of DCI sizes based on the configuration information. If N is greater than a first threshold, the processing unit is further configured to: determine Q types of DCI sizes, and detect a downlink control channel in a first time unit based on the Q types of DCI sizes, where Q is less than or equal to the first threshold.

With reference to the third aspect, in an implementation of the third aspect, that the processing unit is further configured to determine Q types of DCI sizes specifically includes: The processing unit determines the Q types of DCI sizes from the N types of DCI sizes. The N types of DCI sizes correspond to the M component carriers, and the Q types of DCI sizes correspond to a portion of the M component carriers.

With reference to the third aspect and the foregoing implementation of the third aspect, in another implementation of the third aspect, that the processing unit detects a downlink control channel in a first time unit includes: The processing unit detects the downlink control channel in search spaces of the portion of the M component carriers based on the Q types of DCI sizes. The search spaces are determined based on carrier numbers of the portion of the M component carriers and a search space set configured for the portion of the M component carriers.

With reference to the third aspect and the foregoing implementations of the third aspect, in another implementation of the third aspect, that detect a downlink control channel in a first time unit includes: The processing unit detects the downlink control channel in search spaces of the M component carriers based on the Q types of DCI sizes.

With reference to the third aspect and the foregoing implementations of the third aspect, in another implementation of the third aspect, that the processing unit determines the Q types of DCI sizes includes: The processing unit determines the Q types of DCI sizes from the N types of DCI sizes.

With reference to the third aspect and the foregoing implementations of the third aspect, in another implementation of the third aspect, that the processing unit detects a downlink control channel in a first time unit further includes: The processing unit detects, based on a DCI size $a_2$, the downlink control channel in a search space of a component carrier corresponding to a DCI size $a_1$. The DCI size $a_1$ is one of the N types of DCI sizes, other than the Q types of DCI sizes, and the DCI size $a_2$ is in the Q types of DCI sizes, is greater than or equal to $a_1$, and has a smallest difference from $a_1$.

With reference to the third aspect and the foregoing implementations of the third aspect, in another implementation of the third aspect, the Q types of DCI sizes are Q types of DCI sizes with largest values of DCI sizes in the N types of DCI sizes.

With reference to the third aspect and the foregoing implementations of the third aspect, in another implementation of the third aspect, that the processing unit detects a downlink control channel in a first time unit further includes: The processing unit detects, based on a DCI size $a_2$, the downlink control channel in a search space of a component carrier corresponding to a DCI size $a_1$. The DCI size $a_1$ is one of the N types of DCI sizes, and the DCI size $a_2$ is in the Q types of DCI sizes, is greater than or equal to $a_1$, and has a smallest difference from $a_1$.

With reference to the third aspect and the foregoing implementations of the third aspect, in another implementation of the third aspect, that the processing unit is configured to determine Q types of DCI sizes further includes: sequentially removing (N−Q) types of DCI sizes from the N types of DCI sizes, where the DCI size selected at an $m^{th}$ time meets that: the DCI size selected at the $m^{th}$ time is one of the (N−m+1) DCI sizes that are not selected before the $m^{th}$ selection; the DCI size selected at the $m^{th}$ time allows a sum of overheads of all DCI sizes in a DCI size set including DCI sizes selected at first m times to be a smallest value of sums of DCI size overheads of all the DCI sizes separately included in (N−m+1) DCI size sets that are formed during the $m^{th}$ selection and that are formed by using each of the (N−m+1) DCI sizes as a DCI size selected at the $m^{th}$ time; and a DCI size overhead in a DCI size set is a smallest value of differences between a DCI size in the DCI size set and (N−m) DCI sizes that are in the N types of DCI sizes and that are other than m DCI sizes included in the DCI size set.

With reference to the third aspect and the foregoing implementations of the third aspect, in another implementation of the third aspect, the Q types of DCI sizes meet one or more of the following conditions: the Q types of DCI sizes are predefined; the Q types of DCI sizes are determined based on a largest value and/or a smallest value of the N types of DCI sizes; and the Q types of DCI sizes are in an arithmetic progression.

According to a fourth aspect, a network device is provided, including: a processing unit, configured to determine configuration information of M component carriers; and a sending unit, configured to send the configuration information to a terminal device. The sending unit is further configured to send a downlink control channel in a first time unit based on Q types of DCI sizes, where Q is less than or equal to a first threshold. The processing unit is further configured to configure N types of DCI sizes for the M component carriers, where N is greater than the first threshold.

With reference to the fourth aspect, in an implementation of the fourth aspect, the Q types of DCI sizes are included in the N types of DCI sizes, the N types of DCI sizes correspond to the M component carriers, and component carriers corresponding to the Q types of DCI sizes are a portion of the M component carriers.

With reference to the fourth aspect and the foregoing implementation of the fourth aspect, in another implementation of the fourth aspect, that the sending unit is configured to send a downlink control channel in a first time unit based on Q types of DCI sizes includes: The sending unit sends, based on the Q types of DCI sizes, the downlink control channel on resources corresponding to search spaces of the portion of the M component carriers.

With reference to the fourth aspect and the foregoing implementations of the fourth aspect, in another implementation of the fourth aspect, that the sending unit sends a downlink control channel in a first time unit based on Q types of DCI sizes includes: The sending unit sends, based on the Q types of DCI sizes, the downlink control channel on resources corresponding to search spaces of the M component carriers.

With reference to the fourth aspect and the foregoing implementations of the fourth aspect, in another implementation of the fourth aspect, the Q types of DCI sizes are Q types of DCI sizes in the N types of DCI sizes.

With reference to the fourth aspect and the foregoing implementations of the fourth aspect, in another implementation of the fourth aspect, that the sending unit sends a downlink control channel in a first time unit based on Q types of DCI sizes includes: The processing unit sends, based on a DCI size $a_2$, the downlink control channel on resources corresponding to a search space of a component carrier corresponding to the DCI size $a_1$. The DCI size $a_1$ is one of the N types of DCI sizes, other than the Q types of DCI sizes, and the DCI size $a_2$ is in the Q types of DCI sizes, is greater than or equal to $a_1$, and has a smallest difference from $a_1$.

With reference to the fourth aspect and the foregoing implementations of the fourth aspect, in another implementation of the fourth aspect, the Q types of DCI sizes are Q types of DCI sizes with largest values of DCI sizes in the N types of DCI sizes.

With reference to the fourth aspect and the foregoing implementations of the fourth aspect, in another implementation of the fourth aspect, that the sending unit sends a downlink control channel in a first time unit based on Q types of DCI sizes includes: The network device sends, based on a DCI size $a_2$, the downlink control channel on resources corresponding to a search space of a component carrier corresponding to the DCI size $a_1$. The DCI size $a_1$ is one of the N types of DCI sizes, and the DCI size $a_2$ is in the Q types of DCI sizes, is greater than or equal to $a_1$, and has a smallest difference from $a_1$.

With reference to the fourth aspect and the foregoing implementations of the fourth aspect, in another implementation of the fourth aspect, the Q types of DCI sizes include: sequentially removing (N−Q) types of DCI sizes from the N types of DCI sizes, where the DCI size selected at an $m^{th}$ time meets that: the DCI size selected at the $m^{th}$ time is one of the (N−m+1) DCI sizes that are not selected before the $m^{th}$ selection; the DCI size selected at the $m^{th}$ time allows a sum of overheads of all DCI sizes in a DCI size set including DCI sizes selected at first m times to be a smallest value of sums of DCI size overheads of all the DCI sizes separately included in (N−m+1) DCI size sets that are formed during the $m^{th}$ selection and that are formed by using each of the (N−m+1) DCI sizes as a DCI size selected at the $m^{th}$ time; and a DCI size overhead in a DCI size set is a smallest value of differences between a DCI size in the DCI size set and (N−m) DCI sizes that are in the N types of DCI sizes and that are other than m DCI sizes included in the DCI size set.

With reference to the fourth aspect and the foregoing implementations of the fourth aspect, in another implementation of the fourth aspect, the Q types of DCI sizes meet one or more of the following conditions: the Q types of DCI sizes are predefined; the Q types of DCI sizes are determined based on a largest value and/or a smallest value of the N types of DCI sizes; and the Q types of DCI sizes are in an arithmetic progression.

According to a fifth aspect, a communications system is provided. A structure of the communications system includes a processor. The processor is configured to support a server in executing functions in the foregoing first and second aspects and various implementations of the first and second aspects. In a possible design, the server may further include a transceiver, configured to support the server in receiving or sending information. In a possible design, the server may further include a memory. The memory is configured to: be coupled to the processor, and store a program instruction and data that are necessary for the server. Alternatively, the server includes a memory and a processor, the memory is configured to store a computer program, and the processor is configured to: invoke the computer program from the memory and run the computer program, so that the server performs the data processing method in any one of the first aspect, the second aspect, or various implementations of the first aspect and the second aspect.

According to a sixth aspect, a computer-readable storage medium is provided. The computer-readable storage medium stores a program, and the program enables a server to perform the data processing method in any one of the first aspect, the second aspect, or various implementations of the first aspect and the second aspect. Alternatively, the computer-readable storage medium is configured to store a computer software instruction used by the server, and the computer software instruction includes a program designed to perform the methods in the first aspect and the second aspect.

According to a seventh aspect, a chip system is provided. The chip system includes a processor, configured to support a server in implementing functions related to the foregoing first and second aspects and various implementations of the first and second aspects.

According to the communication method, the terminal device, and the network device provided in this application, a downlink control channel is detected in a first time unit based on Q types of DCI sizes, where Q is less than or equal to a first threshold, so that a capability of detecting a DCI size by the terminal device can be fully used.

DESCRIPTION OF EMBODIMENTS

Figure 1:
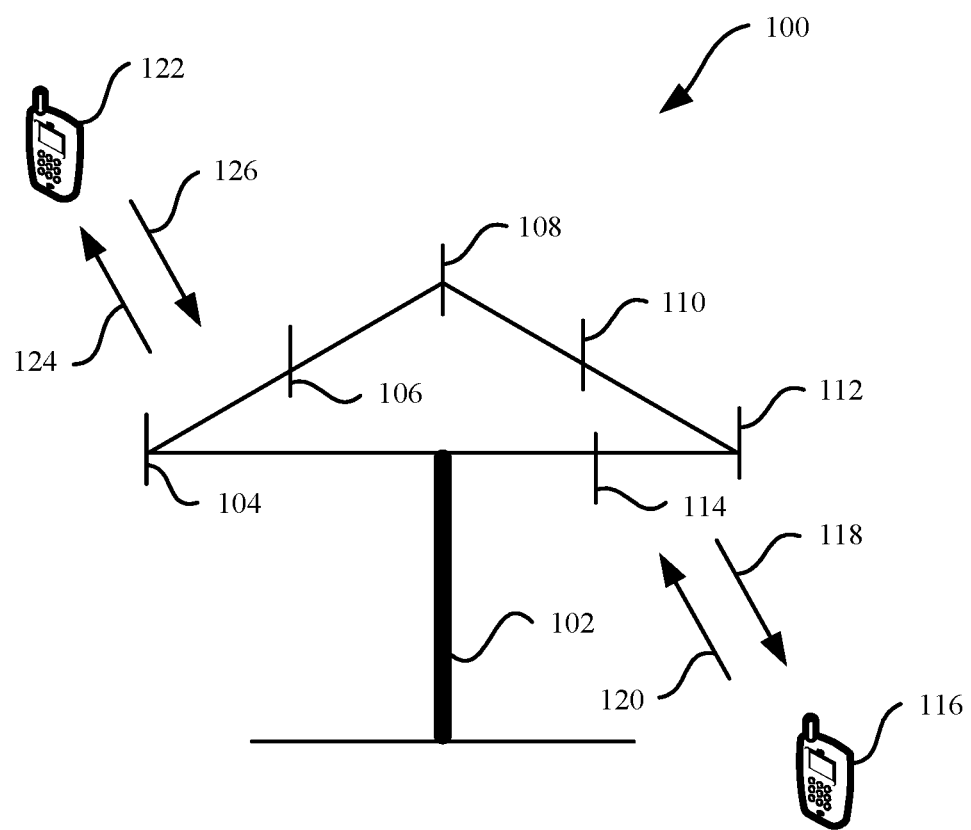
FIG. 1 is a schematic architectural diagram of a communications system applied to an embodiment of this application.

The following describes technical solutions in this application with reference to the accompanying drawings.

The technical solutions in the embodiments of this application may be applied to various communications systems, such as: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

As an example rather than a limitation, in the embodiments of this application, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station in a WLAN, may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device and a next generation communications system, for example, a terminal device in a 5G network or a terminal device in a future evolved public land mobile network (PLMN) network.

As an example rather than a limitation, in the embodiments of this application, the terminal device may further be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the terminal device in the embodiments of this application may alternatively be a terminal device in an internet of things (IoT) system. IoT is an important part of development of future information technologies, and a main technical feature of the IoT is that a thing is connected to a network by using a communications technology, to implement an intelligent network for interconnection between a person and a machine or between one thing and another.

In the embodiments of this application, an IOT technology may implement massive connections, deep coverage, and power saving for a terminal by using, for example, a narrow band (NB) technology. For example, the NB includes only one resource block (RB). In other words, bandwidth of the NB is only 180 KB. To implement massive access, access of terminals needs to be discrete. According to a communication method in the embodiments of this application, a congestion problem that occurs in the IOT technology when massive terminals access a network by using the NB can be effectively resolved.

A network device may be a device, such as an access network device, configured to communicate with a mobile device. As an example rather than a limitation, in this application, the network device may be an access point (AP) in the WLAN, or a base transceiver station (Base Transceiver Station, BTS) in the GSM or CDMA, or may be a NodeB in the WCDMA, or a gNB in the new radio (NR) system, or may be an evolved NodeB (eNB or eNodeB) in the LTE, or a relay station or an access point, or a vehicle-mounted device, a wearable device, an access network device in the future 5G network, an access network device in the future evolved PLMN network, or the like.

In addition, in the embodiments of this application, the access network device provides a service for a cell, and the terminal device communications with the access network device by using a transmission resource (for example, a frequency domain resource or a spectrum resource) used by the cell. The cell may be a cell corresponding to the access network device (for example, a base station). The cell may belong to a macro base station or a base station corresponding to a small cell (Small cell). The small cell herein may include a metro cell (Metro cell), a micro cell (Micro cell), a pico cell (Pico cell), a femto cell (Femto cell), or the like. The small cells feature small coverage and low transmit power, and are suitable for providing a high-rate data transmission service.

In addition, in the LTE system or the 5G system, a plurality of cells may simultaneously work on a component carrier at a same frequency. In some special scenarios, it may also be considered that a concept of the component carrier is equivalent to a concept of the cell. For example, in a component carrier aggregation (CA) scenario, when a secondary component carrier is configured for UE, a carrier index of the secondary component carrier and a cell identity (Cell ID) of a secondary cell working on the secondary component carrier are both carried. In this case, it may be considered that the concept of the component carrier is equivalent to the concept of the cell. For example, that UE accesses a component carrier is equivalent to that the UE accesses a cell.

A core network device may be connected to a plurality of access network devices, and is configured to control the access network devices. In addition, the core network device can distribute, to the access network devices, data received from a network side (for example, the Internet).

The foregoing enumerated functions and specific implementations of the terminal device, the access network device, and the core network device are merely examples for description, and this application is not limited thereto.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process (Process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features in the embodiments of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

It should be noted that in the embodiments of this application, a plurality of application programs may be run at the application layer. In this case, an application program for performing the communication method in the embodiments of this application may be different from an application program configured to control a receive end device to implement an action corresponding to received data.

FIG. 1 is a schematic diagram of a system 100 to which a communication method according to an embodiment of this application is applicable. As shown in FIG. 1, the system 100 includes an access network device 102. The access network device 102 may include one or more antennas, for example, antennas 104, 106, 108, 110, 112, and 114. In addition, the access network device 102 may further include a transmitter chain and a receiver chain. A person of ordinary skill in the art may understand that the transmitter chain and the receiver chain may both include a plurality of components (for example, a processor, a modulator, a multiplexer, a demodulator, a demultiplexer, or an antenna) related to signal sending and receiving.

The access network device 102 may communicate with a plurality of terminal devices (for example, a terminal device 116 and a terminal device 122). However, it may be understood that the access network device 102 may communicate with any quantity of terminal devices that are similar to the terminal device 116 or the terminal device 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or an area that are/is designed for communication are/is referred to as a sector of the access network device 102. For example, an antenna group may be designed to communicate with a terminal device in a sector within a coverage area of the access network device 102. The access network device may send, through a single antenna or a multi-antenna transmit diversity, signals to all terminal devices in the sector corresponding to the access network device. In a process in which the access network device 102 communicates with the terminal devices 116 and 122 respectively over the forward links 118 and 124, a transmit antenna of the access network device 102 may improve signal-to-noise ratios of the forward links 118 and 124 through beamforming. In addition, compared with a manner in which the access network device sends, through the single antenna or the multi-antenna transmit diversity, signals to all terminal devices served by the access network device, when the access network device 102 uses beamforming to send signals to the terminal devices 116 and 122 that are randomly scattered in the related coverage area, interference to a mobile device in a neighboring cell is less.

At a given time, the access network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits to be sent, through a channel, to the wireless communications receiving apparatus. The data bits may be included in a transport block (or a plurality of transport blocks) of data, and the transport block may be segmented to generate a plurality of code blocks.

In addition, the communications system 100 may be a PLMN network, a D2D network, an M2M network, an IoT network, or another network. FIG. 1 is merely a simplified schematic diagram used as an example. Another access network device may further be included in a network, and is not shown in FIG. 1.

In the embodiments of this application, data or information may be carried on a time-frequency resource, and the time-frequency resource may include a time domain resource and a frequency domain resource. In time domain, the time-frequency resource may include one or more time domain units (or may also be referred to as time units). In frequency domain, the time-frequency resource may include a frequency domain unit.

A time domain unit (which may also be referred to as a time unit) may be a symbol, a mini-slot, a slot, or a subframe. Duration of one subframe in time domain may be 1 millisecond (ms). One slot includes seven or 14 symbols, and one mini-slot may include at least one symbol (for example, two symbols, seven symbols, or 14 symbols, or any quantity of symbols less than or equal to 14 symbols).

A frequency domain unit may be a resource block (RB), or a resource block group (RBG), or a predefined subband (Subband).

In the embodiments of this application, "data" or "information" may be understood as a bit generated after an information block is encoded, or "data" or "information" may further be understood as a modulation symbol generated after an information block is encoded and modulated.

One information block may include at least one transport block (TB), or one information block may include at least one TB group (including at least one TB), or one information block may include at least one code block (CB), or one information block may include at least one CB group (including at least one CB), or the like.

First, basic concepts in the embodiments of this application are briefly described.

In a next-generation communications system, for example, 5G or a new radio (NR) system, a terminal device obtains configuration information that is of a search space set and that is configured by using higher layer signaling, where the configuration information of the search space set includes configuration information such as an aggregation level, a downlink control information format (DCI format), a monitoring periodicity, and a physical downlink control channel candidate (PDCCH candidate) corresponding to the aggregation level.

The PDCCH candidate includes a plurality of control channel elements (CCE). The aggregation level indicates a quantity of consecutive CCEs occupied by one PDCCH. A network device determines, based on factors such as channel quality, an aggregation level used by a PDCCH.

The terminal device needs to perform detection for a plurality of times on the PDCCH candidate including different CCEs. Further, for PDCCH candidates including same CCEs, if control information sizes (Downlink control information size, DCI size) are different, the terminal device also needs to perform detection for a plurality of times.

When more search space sets are configured by the network device, complexity of detecting a physical downlink control channel (PDCCH) by the terminal device increases.

To limit a quantity of detection times of the terminal device, in a slot of a component carrier (CC) unit, a maximum quantity of different DCI sizes detected by the terminal device is set.

For example, a total DCI size detected by the terminal device cannot exceed 4. A quantity of DCI sizes that is detected by the terminal device and that is scrambled with a Cell Radio Network Temporary Identifier (C-RNTI) on a cyclic redundancy check (CRC) cannot exceed 3.

For component carrier aggregation (CA), the terminal device can simultaneously receive/send a data channel on a plurality of carriers.

For example, the terminal device can simultaneously receive a physical downlink shared channel (PDSCH) on a plurality of downlink component carriers (DL CC).

Alternatively, the terminal device can simultaneously send a physical uplink shared channel (PUSCH) on a plurality of uplink component carriers (UL CC).

Figure 2:
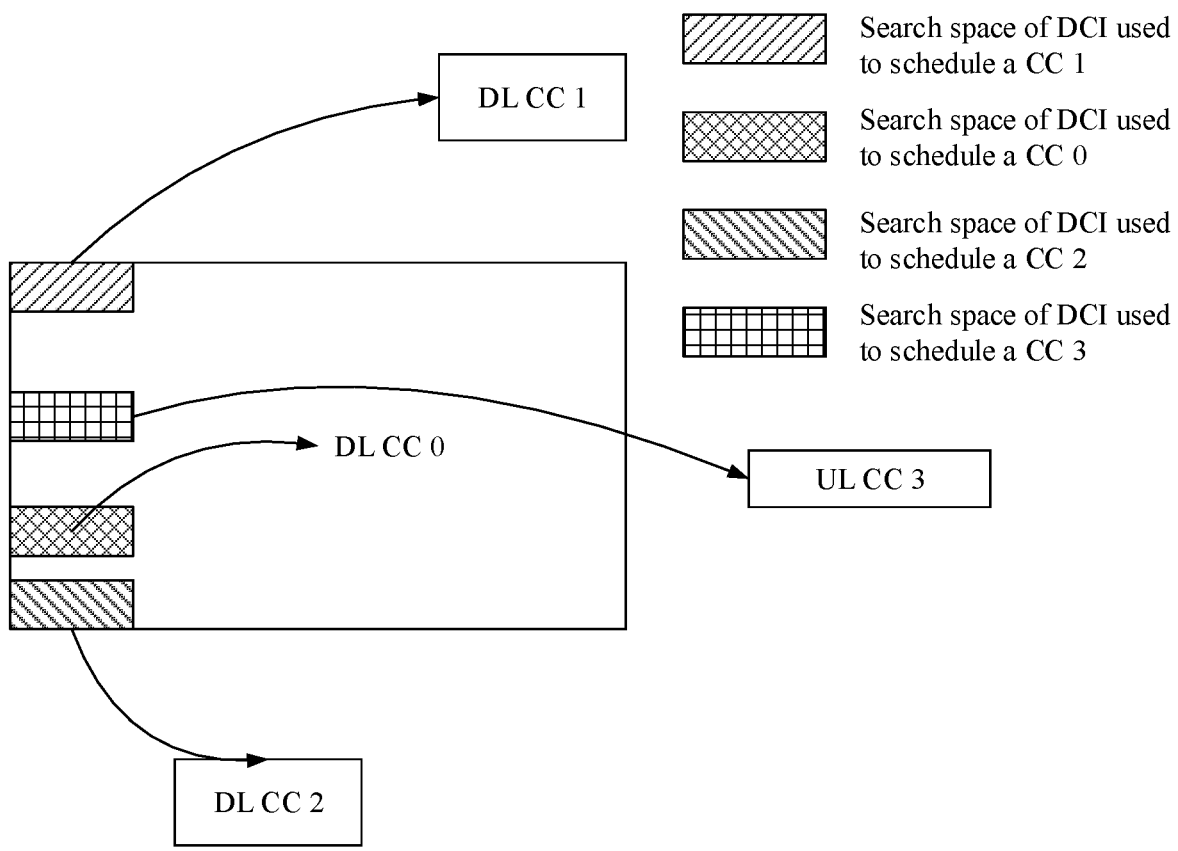
FIG. 2 is a schematic diagram of cross-component-carrier scheduling.

The plurality of DL CCs or UL CCs include a primary component carrier and a secondary component carrier. In addition, the NR supports cross-component-carrier scheduling. As shown in FIG. 2, the PDSCH or the PUSCH is transmitted on a CC, but is not transmitted on a CC on which a corresponding PDCCH used to schedule the PDSCH or the PUSCH is located. A component carrier indicator information field in PDCCH DCI provides a number of a CC on which a scheduled PDSCH/PUSCH is located.

FIG. 2 is a schematic diagram of cross-component-carrier scheduling. A search space of DCI used to schedule a CC 0, a search space of DCI used to schedule a CC 1, a search space of DCI used to schedule a CC 2, and a search space of DCI used to schedule a CC 2 are included in the figure. That DCI schedules a CC means that the DCI can schedule a data channel transmitted on the CC.

A DL CC 0, a DL CC 1, a DL CC 2, and a UL CC 3 are further included in the figure. It can be intuitively learned from the figure that the search space of the DCI used to schedule the CC 0, the search space of the DCI used to schedule the CC 1, the search space of the DCI used to schedule the CC 2, and the search space of the DCI used to schedule the CC 3 are all in the DL CC 0, but are not on the CC on which the corresponding PDCCH used to schedule the PDSCH or the PUSCH is located, which is the cross-component-carrier scheduling.

To indicate a CC on which a PDSCH or a PUSCH is scheduled, each CC is numbered. A primary component carrier is always numbered 0, and different secondary component carriers are allocated with a specific number through a UE-specific radio resource control (RRC) signal.

The PDSCH or the PUSCH on one CC can be scheduled only on one CC. Each first CC on which the PDSCH or the PUSCH is transmitted has an associated second CC, and corresponding DCI used to schedule the PDSCH or the PUSCH is transmitted on the second CC, which is configured by using RRC signaling. In addition, if the cross-component-carrier scheduling is configured on one CC, a UE-specific Search Space (USS) is configured, on the CC, for each associated CC on which the PDSCH or the PUSCH is transmitted, a terminal device detects a DCI format 0_1 or a DCI format 1_1 on a USS corresponding to each associated CC. In addition, compared with a CC on which the cross-carrier scheduling is not configured, a maximum quantity of different DCI sizes detected by the terminal device on the CC on which the cross-component-carrier scheduling is configured may increase.

For one CC on which the cross-component-carrier scheduling is scheduled, it may be configured that resources on a maximum of eight DL CCs and resources on a maximum of eight UL CCs are scheduled on the CC. For PDSCHs or PUSCHs transmitted on different CCs, sizes of corresponding DCI used to schedule the PDSCHs or the PUSCHs may be different.

Therefore, for the CC on which the cross-component-carrier scheduling is configured, in a given slot, the terminal device may need to detect, on the CC, eight DCI formats 0_1 with different sizes and eight DCI formats 1_1 with different sizes. In addition, another DCI format may be configured on the component carrier. Therefore, a quantity of different DCI sizes detected by the terminal device on the CC on which the cross-component-carrier scheduling is configured is, for example, 8+8+X, where X is a different size of another DCI format. The quantity may exceed the maximum quantity of different DCI sizes detected by the terminal device on the CC. For example, a maximum value is 8 or 10. In this case, the quantity of different DCI sizes detected by the terminal device on the CC needs to be reduced.

For ease of understanding, the following explains some terms in this application.

The DCI format is used to define a location of a control information field (Field) in the DCI.

For example, the downlink control information includes A information bits, that is, $a_0, a_1, \ldots,$ and $a_{A-1}$. A most significant bit (MSB) in a first control information field in the downlink control information is mapped to a lowest-numbered information bit, that is, $a_0$, and a subsequent control information field is mapped to a higher-numbered information bit. A most significant bit in each control information field is mapped to a lowest-numbered information bit in the field.

The downlink control information format includes different DCI formats shown in Table 1.

TABLE 1

DCI format

| DCI format | Usage (Usage) |
|---|---|
| 0_0 | Scheduling of an uplink shared channel (for example, scheduling of an uplink common channel) in one cell or component carrier (Scheduling of PUSCH in one cell) |
| 0_1 | Scheduling of an uplink shared channel (for example, scheduling of an uplink dedicated channel) in one cell or component carrier (Scheduling of PUSCH in one cell) |
| 1_0 | Scheduling of a downlink shared channel (for example, scheduling of a downlink common channel) in one cell or component carrier (Scheduling of PDSCH in one cell) |
| 1_1 | Scheduling of a downlink shared channel (for example, scheduling of a downlink dedicated channel) in one cell or component carrier (Scheduling of PDSCH in one cell) |
| 2_0 | Indicating a slot format for a group of terminal devices (Notifying a group of UEs of the slot format) |
| 2_1 | Indicating a physical resource block or an OFDM symbol to a group of terminal devices, where the terminal device assumes that no transmission for the terminal device is performed on the physical resource block or the OFDM symbol (Notifying a group of UEs of the PRB(s) and OFDM symbol(s) where UE may assume no transmission is intended for the UE) |

TABLE 1-continued

DCI format

| DCI format | Usage (Usage) |
|---|---|
| 2_2 | Sending a transmit power control instruction for an uplink control channel and an uplink shared channel (Transmission of TPC commands for PUCCH and PUSCH) |
| 2_3 | Sending a transmit power control instruction for a group of channel sounding reference signals to one or more terminal devices (Transmission of a group of TPC commands for SRS transmissions by one or more UEs) |

DCI size: The downlink control information size may be defined as a quantity of information bits included in the downlink control information. If the DCI includes A information bits, the downlink control information size is A. Alternatively, the downlink control information size may be defined as a sum of a quantity of information bits included in the DCI and a length of cyclic redundancy check (CRC) code. For example, if the DCI includes A information bits, and the length of the CRC is L, the DCI size is equal to A+L.

A slot format is a type of an OFDM symbol included in one slot. The OFDM symbol in one slot may be a downlink, uplink, or flexible symbol. As shown in Table 2:

TABLE 2

Slot format

| For-mat | Symbol number in a slot (Symbol number in a slot) | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| ... | | | | | | | | | | | | | | |

The table shows that when one slot includes 14 orthogonal frequency division multiplexing (OFDM) symbols, different slot formats correspond to different types of OFDM symbols. For the Slot format 0, all OFDM symbols in the slot are downlink symbols.

The slot is a time unit, and includes a given quantity of OFDM symbols. The quantity of OFDM symbols may be 14 or 12.

It should be understood that Table 1 and Table 2 are drawn by using examples for more convenient understanding of concepts in this application, and may further include other cases. This is not limited in this application.

In the prior art, to resolve a problem that the quantity of different DCI sizes detected by the terminal device on the CC on which the cross-component-carrier scheduling is configured may exceed the maximum quantity of different DCI sizes detected by the terminal device on the CC, a method for aligning DCI sizes is proposed.

The following briefly describes the method for aligning DCI sizes.

For example, for the CC on which the cross-component-carrier scheduling is configured, the DCI formats 0_1 or the DCI formats 1_1 with different DCI sizes need to be transmitted.

If the quantity of different DCI sizes detected by the terminal device on the CC exceeds the maximum quantity of different DCI sizes detected by the terminal device on the CC, a network device pads a quantity of bits to DCI sizes of all the DCI formats 1_t on the CC. A value of a padded bit may be 0, in other words, zero padding is performed.

Therefore, the DCI sizes obtained after the quantity of bits are padded are equal to a largest value of DCI sizes in all the DCI formats 1_1.

For example, the terminal device detects four types of different DCI sizes on the CC: "1", "11", "111", and "1111". When the terminal device detects two types of maximum quantities of different DCI sizes on the CC, a quantity of bits are padded to the DCI sizes. Specifically, three bits are padded to "1", and "1" changes to "1000". Two bits are added to "11", and "11" changes to "1100". One bit is added to "111", and "111" changes to "1110". In this way, the terminal device detects one type of different DCI sizes on the CC, and each of the DCI sizes has four bits.

Likewise, the network device pads a quantity of bits to all DCI formats 0_1 on the CC. A value on a padded bit may be 0, in other words, zero padding is performed.

Therefore, the DCI sizes obtained after the quantity of bits are padded are equal to a largest value of the DCI sizes in all the DCI formats 0_1.

In the foregoing method for aligning DCI sizes, for the CC on which the cross-component-carrier scheduling is configured, if a large quantity of DL CCs or UL CCs are configured, DCI sizes of the DCI formats 0_1 and the DCI formats 1_1 may be relatively large, and a difference between the DCI sizes may be relatively large. Consequently, a relatively large quantity of bits are padded, causing a waste of resources and affecting overall system performance. In addition, a capability of detecting a DCI size by a terminal device is not fully used.

It should be noted that the DCI size in this embodiment of this application is an information length of the DCI. For example, the DCI size may be a length of an information bit sequence in the DCI, or a sum of the length of the DCI information bit sequence and the length of the CRC (cyclic redundancy check code, cyclic redundancy code). This may not be specifically limited herein, and a DCI size that can be clearly determined by a person skilled in the art is used.

To resolve the foregoing problem of wasting resources, this application provides a communication method, so as to save resources of a network system. With reference to FIG. 3 to FIG. 7, the following describes in detail the communication method provided in the embodiments of this application.

Figure 3:
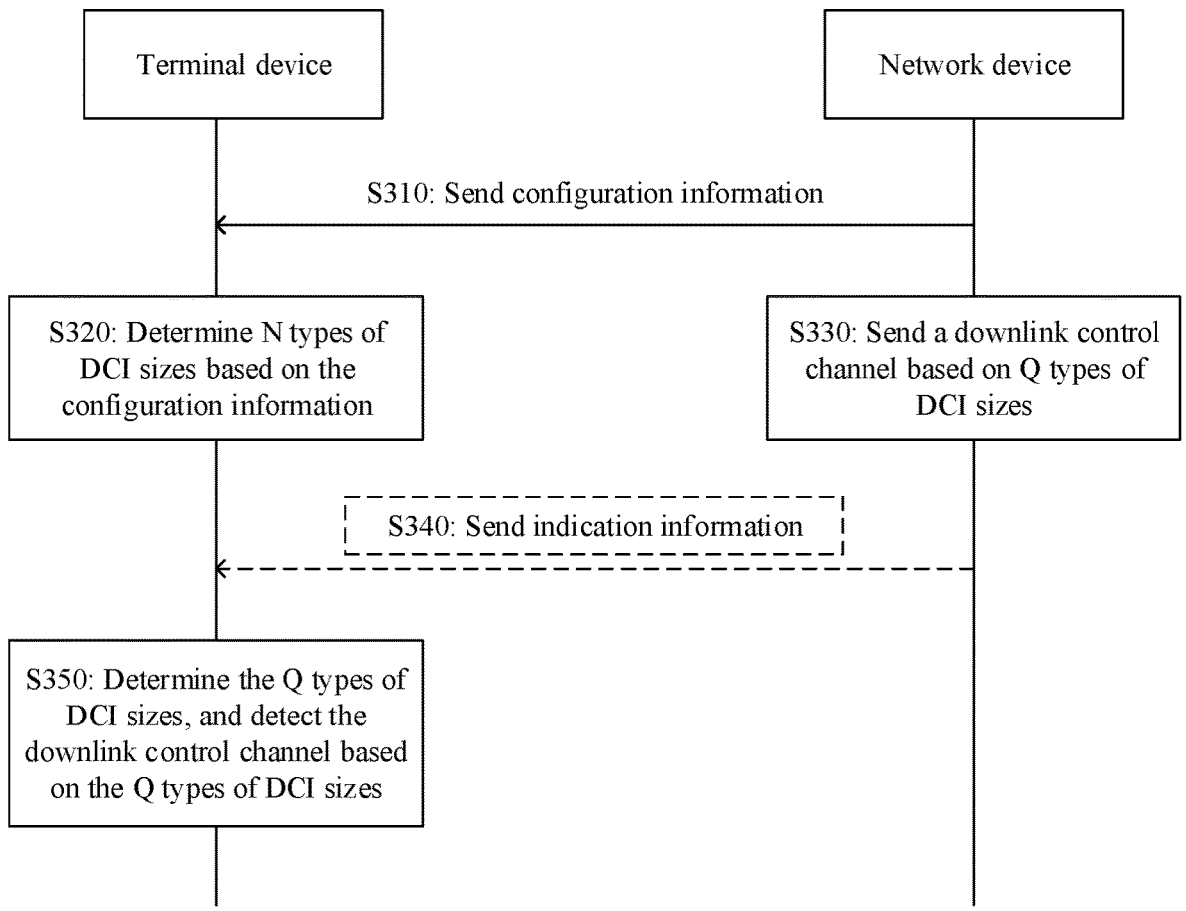
FIG. 3 is a schematic diagram of a communication method according to an embodiment of this application.

FIG. 3 shows a communication method according to an embodiment of this application. The method includes: S310 to S350. The following describes the five steps in detail.

S310: A network device sends configuration information.

The network device determines configuration information of M component carriers. The network device sends the configuration information to a terminal device. The terminal device receives the configuration information sent by the network device. M is a positive integer, and may be 1 or another possible quantity.

It should be understood that the configuration information may be one or more pieces of configuration information.

It should be understood that in this embodiment of this application, a quantity of types of DCI sizes based on which the terminal device detects a downlink control channel is limited in a unit of one time unit. Optionally, a first time unit may be a possible time granularity such as a slot or a subframe. In other words, the solution in this embodiment of this application relates to limiting, in a time unit, a maximum quantity of types of DCI sizes based on which the terminal device detects the downlink control channel. Herein, types of DCI sizes are logically classified based on values of the DCI sizes. To be specific, a plurality of pieces of DCI having a same value of DCI size have a same type of DCI size.

S320: The terminal device determines N types of DCI sizes based on the configuration information.

The configuration information further includes configuration information of the plurality of component carriers. The configuration information of the component carriers includes the following: 1. A format and a size of DCI transmitted on the component carriers, where the size of the DCI format may be directly configured based on higher layer signaling, for example, a DCI format 2_0/2_1. 2. A number of a carrier on which DCI (for example, a DCI format 0_1/1_1) used to schedule data is located, and a number of a carrier on which a PDSCH/PUSCH scheduled by the DCI is located may be configured based on the higher layer signaling. 3. Sizes of some information fields in the DCI used to schedule the PDSCH/PUSCH transmitted on the component carriers may be configured based on the higher layer signaling, and a base station and UE may determine the DCI size based on the information.

It can be seen from the foregoing that, based on the configuration information of the carriers, the base station and the UE may determine a correspondence between a DCI size and a component carrier, that is, a DCI format corresponding to the DCI size, a number of a component carrier on which a corresponding DCI format is transmitted, and a number of a component carrier on which the PDSCH/PUSCH scheduled by a corresponding DCI format is located. In this embodiment, the DCI format corresponding to the DCI size and the number of the component carrier on which the PDSCH/PUSCH scheduled by the corresponding DCI format is located are mainly used.

Therefore, the DCI size corresponds to the DCI format and the configuration information of the component carriers, and the N types of DCI sizes can be determined based on the DCI format and the configuration information of the component carriers.

Optionally, in some embodiments, N includes n1 and/or n2, where n1 is a quantity of DCI sizes corresponding to the downlink control information format DCI format 1_1, n2 is a quantity of DCI sizes corresponding to the DCI format 0_1, and n1 and n2 are positive integers.

Optionally, in some embodiments, N further includes X, where X is a quantity of DCI sizes corresponding to a DCI format in DCI formats, other than the DCI format 1_1 and the DCI format 0_1, and X is a positive integer.

Optionally, in some embodiments, n1 is determined based on N1, where N1 is a quantity of downlink component carriers DL CCs that can be scheduled by the component carriers; and n2 is determined based on N2, where N2 is a quantity of uplink component carriers UL CCs that can be scheduled by the component carriers.

It should be understood that a component carrier corresponds to a DCI size and a DCI format. Therefore, a quantity of DCI sizes can be determined based on a quantity of component carriers.

For example, the terminal device determines a CC that is configured by the network device for the terminal device and that supports the cross-component-carrier scheduling, a DL CC on which a PDSCH scheduled by a PDCCH transmitted on the CC is located, and a UL CC on which a PUSCH scheduled by the PDCCH is located.

A quantity of DL CCs that can be scheduled on the CC is N1.

Optionally, numbers of the DL CCs may be arranged in ascending order: $d_1, d_2 \ldots d_{N1}$, and the scheduled DL CCs can correspond to a total of n1 types of DCI formats 1_1 with different DCI sizes, where n1≤N1.

It should be understood that, n1=N1 means that DCI sizes of the DCI formats 1_1 corresponding to the DL CCs are different.

A quantity of UL CCs that can be scheduled on the CC is N2.

Optionally, numbers of the UL CCs may be arranged in ascending order: $u_1, u_2 \ldots u_{N2}$, and the scheduled UL CCs can correspond to a total of n2 types of DCI formats 0_1 with different sizes, where n2≤N2.

It should be understood that, n2=N2 means that DCI sizes of the DCI formats 0_1 corresponding to the UL CCs are different.

Optionally, the terminal device determines that a quantity of different DCI sizes of other DCI formats is X. For example, for a primary component carrier of a primary cell (Pcell) having a cross-component-carrier function, the other DCI formats may be a DCI format 0_0, a DCI format 1_0, a DCI format 2_1, and the like that can be configured by the terminal device to transmit in a common search space (CSS).

S330: Send the downlink control channel in the first time unit based on Q types of DCI sizes.

The network device sends the downlink control channel in the first time unit based on the Q types of DCI sizes, where Q is less than or equal to a first threshold. Types of DCI sizes configured by the network device for the M component carriers are N, and N is greater than the first threshold.

Optionally, in some embodiments, the Q types of DCI sizes are included in the N types of DCI sizes, the N types of DCI sizes correspond to the M component carriers, and component carriers corresponding to the Q types of DCI sizes are a portion of the M component carriers.

It should be understood that the portion of the M component carriers are a subset or a proper subset of the M component carriers. In other words, a quantity of component carriers corresponding to the selected Q types of DCI sizes is less than the M component carriers corresponding to the N types of DCI sizes.

In addition, it should be understood that the quantity of component carriers corresponding to the Q types of DCI sizes should be greater than or equal to 1 and less than or equal to a quantity of component carriers corresponding to the first threshold.

It should be further understood that Q is a positive integer greater than or equal to 2 and less than or equal to the first threshold. When Q is equal to 1, a capability of detecting a DCI size by the terminal device is limited. Therefore, at least two types of DCI sizes should be determined.

That the network device sends the downlink control channel in the first time unit based on Q types of DCI sizes includes:

sending, by the network device based on the Q types of DCI sizes, the downlink control channel on resources corresponding to search spaces of the portion of the M component carriers, where the resources corresponding to the search spaces are physical time-frequency resources to which CCEs forming the search spaces are mapped.

The search spaces of the component carriers refer to that, for each component carrier, the higher layer signaling configures one or more search space sets for the component carrier, and a search space of the component carrier in one search space set may be determined based on a number of the search space set and a number of the component carrier. A base station may send, in resources corresponding to the search space, the PDCCH that schedules a data channel transmitted on the component carrier.

For example, if N=10, and Q=8, the network device selects resources corresponding to search spaces of component carriers corresponding to eight of 10 types of DCI sizes to send the downlink control channel. Resources corresponding to the search spaces of component carriers corresponding to the remaining two types of DCI sizes may not be used to send the downlink control channel.

Optionally, in some other embodiments, that the network device sends the downlink control channel in the first time unit based on Q types of DCI sizes includes: sending, by the network device based on the Q types of DCI sizes, the downlink control channel on resources corresponding to search spaces of the M component carriers.

For example, if N=10, and Q=8, the network device pads a quantity of bits to the two types of DCI sizes in the 10 types of DCI sizes, other than the eight types of DCI sizes, so that the DCI sizes obtained after the quantity of bits are padded to the two types of DCI sizes are equal to any one of the eight types of DCI sizes. In other words, eight types of DCI sizes can be finally determined. The downlink control channel is sent, based on the eight types of DCI sizes, on resources corresponding to search spaces of the 10 component carriers.

Optionally, in some other embodiments, the network device sends, based on a DCI size $a_2$, a downlink control channel in which the DCI size is $a_2$ on resources corresponding to a search space of a component carrier corresponding to a DCI size $a_1$, where the DCI size $a_1$ is one of the N types of DCI sizes, other than the Q types of DCI sizes, and the DCI size $a_2$ is in the Q types of DCI sizes, is greater than or equal to $a_1$ and has a smallest difference from $a_1$.

For example, if N=10, and Q=8, the network device pads a quantity of bits to the two types of DCI sizes in the 10 types of DCI sizes, other than the eight types of DCI sizes, so that the DCI sizes obtained after the quantity of bits are padded to the two types of DCI sizes are equal to a DCI size that is in the eight types of DCI sizes and that is closest to and greater than DCI sizes of the two types of DCI sizes. In other words, eight types of DCI sizes can be finally determined. The downlink control channel is sent, based on the eight types of DCI sizes, on resources corresponding to search spaces of the 10 component carriers.

It should be understood that the remaining two types of DCI sizes are aligned to the determined eight types of DCI sizes, so that the obtained DCI sizes are closest to and greater than the two types of DCI sizes. The closest DCI sizes can be selected to reduce a quantity of padded bits required for aligning DCI sizes. A reason why the DCI sizes greater than the two types of DCI sizes are selected is that DCI sizes of the remaining two types of DCI sizes can be aligned to the determined eight types of DCI sizes only by padding a quantity of bits, but the sizes of the DCI sizes cannot be reduced.

It should be understood that, to ensure that any one of (N−Q) types of DCI sizes can be aligned to one of the determined Q types of DCI sizes by padding a quantity of bits, the Q types of DCI sizes should include a DCI size with a largest DCI size in the N types of DCI sizes.

Optionally, in some other embodiments, the Q types of DCI sizes determined by the network device are Q types of DCI sizes with largest values of DCI sizes in the N types of DCI sizes.

For example, if N=10, and Q=8, the network device sorts the 10 types of DCI sizes in descending order of DCI sizes, and selects first eight types of DCI sizes as the Q types of DCI sizes. When the remaining two types of DCI sizes are aligned to the determined eight types of DCI sizes, a quantity of bits that need to be padded can be reduced.

The foregoing padding the quantity of bits is a specific implementation of aligning different DCI sizes. It may be understood that alignment between different DCI sizes is completed by padding a quantity of bits of a DCI size with a smaller DCI size in the different DCI sizes.

To describe different methods for aligning DCI sizes, two DCI formats with different DCI sizes are first used as an example to describe a basic concept of aligning DCI sizes in this embodiment of this application.

For example, the two DCI formats with different DCI sizes are a DCI format 1 and a DCI format 2. A DCI size of the DCI format 1 is $a_1$, and a DCI size of the DCI format 2 is $a_2$.

If $a_1<a_2$, k bits are padded to the DCI format 1 whose DCI size is $a_1$, so that $a_1+k=a_2$. In this case, the DCI format 1 whose DCI size is $a_1$ is referred to be aligned to the DCI format 2 whose DCI size is $a_2$, and k is referred to as a quantity of padded (padding) bits. A bit value of the quantity of padded bits is not limited in this application, and may be the "0" padding described in the prior art. Alternatively, bits of other values may be padded, and an alignment result only needs to ensure that DCI sizes are consistent, to be specific, quantities of included bits are consistent.

Figure 4:
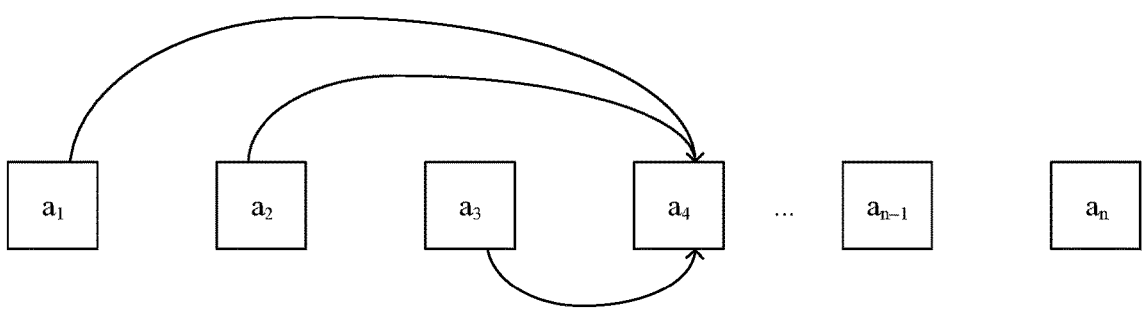
FIG. 4 is a schematic diagram of aligning DCI sizes according to an embodiment of this application.

With reference to FIG. 4, the following describes in detail how to perform alignment by using Q types of DCI sizes with largest DCI sizes in the N types of DCI sizes as the Q types of DCI sizes.

FIG. 4 is a schematic diagram of aligning DCI sizes according to an embodiment of this application. DCI sizes $a_1, a_2, \ldots a_n$ are included in the figure, where a curve between every two types of DCI sizes indicates that a DCI size is aligned to a DCI size indicated by a curve arrow.

The Q types of DCI sizes with the largest DCI sizes in the N types of DCI sizes are used as the Q types of DCI sizes. The N types of DCI sizes need to be sorted in ascending order of DCI sizes, and sorted first (N−Q) DCI types of DCI sizes with different sizes are aligned to a DCI size with a size of $a_{N-Q+1}$.

The following describes the alignment manner with reference to a specific embodiment.

For example, all DL or UL component carriers that can be scheduled on the component carrier correspond to n types of DCI formats 0_1 and/or DCI formats 1_1 with different DCI sizes, and then DCI sizes are sorted in ascending order of DCI sizes: $a_1, a_2, \ldots a_n$, where n=n1+n2.

As shown in FIG. 4, N−Q=3. In this case, DCI sizes of $a_1$, $a_2$, $a_3$ need to be aligned to a DCI size of $a_4$.

A quantity of each type of DCI size is 1. Therefore, in the alignment method shown in FIG. 4, the quantity of each type of DCI size is not considered.

For ease of understanding the alignment manner shown in FIG. 4, the following uses an example in which a quantity of DL CCs that can be scheduled on the CC is N1=3, and numbers of the DL CCs are arranged in ascending order: $d_1$, $d_2$, $d_3$. The scheduled DL CCs have a total of two types of DCI formats 1_1 with different DCI sizes: "1" and "11", where $d_1$ and $d_2$ correspond to "1", and $d_3$ corresponds to "11".

A quantity of UL CCs that can be scheduled on the CC is N2=3, and numbers of the UL CCs sorted in ascending order are $u_1$, $u_2$, $u_3$. The scheduled UL CCs have a total of two types of DCI formats 0_1 with different DCI sizes: "111" and "1111", where $u_1$ and $u_2$ correspond to "111", and $u_3$ corresponds to "1111".

A calculation process is described by using an example in which $N_{max}$=4 is a maximum quantity of DCI sizes blindly detected by UE on the carrier, X=2, a first threshold is $N_{max}$−X=2, and N=n1+n2=4.

The four DCI sizes are sorted in ascending order: "1", "11", "111", and "1111". "1" and "11" are aligned to "111", and 0 may be padded.

The terminal device detects, on the CC that supports cross-component-carrier scheduling, a DCI format 0_1 and a DCI format 1_1 whose DCI sizes are "111" and "1111".

According to the foregoing alignment method, a quantity of bits of DCI formats 0_1 and/or DCI formats 1_1 that need to be padded can be reduced to some extent, and there is no need to limit a quantity of DL and/or UL component carriers scheduled by the network device on the CC that supports the cross-component-carrier scheduling.

It should be understood that when the quantity of each type of DCI size is not 1, the quantity of each type of DCI size further needs to be considered when the Q types of DCI sizes are selected. The Q types of DCI sizes cannot be selected only based on the DCI sizes sorted in ascending order. The following provides a detailed description with reference to FIG. 5. Details are not described herein again.

Optionally, in some other embodiments, that the network device sends the downlink control channel in the first time unit based on Q types of DCI sizes includes: sending, by the network device based on a DCI size $a_2$, the downlink control channel on resources corresponding to a search space of a component carrier corresponding to the DCI size $a_1$, where the DCI size $a_1$ is one of the N types of DCI sizes, and the DCI size $a_2$ is in the Q types of DCI sizes, is greater than or equal to $a_1$, and has a smallest difference from $a_1$.

Figure 5:
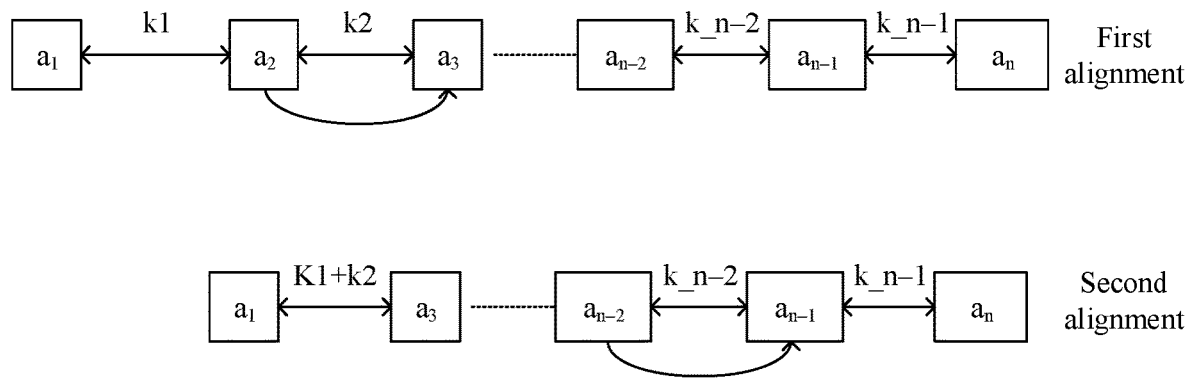
FIG. 5 is another schematic diagram of aligning DCI sizes according to an embodiment of this application.

With reference to FIG. 5, the following describes in detail how to determine the Q types of DCI sizes based on the difference and how to align DCI sizes.

FIG. 5 is another schematic diagram of aligning DCI sizes according to an embodiment of this application. DCI sizes $a_1$, $a_2$, ... $a_n$ are included in the figure, where a curve between every two types of DCI sizes indicates that a DCI size is aligned to a DCI size indicated by a curve arrow.

(N−Q) types of DCI sizes are sequentially removed from the N types of DCI sizes, where the DCI size selected at an $m^{th}$ time meets that:

the DCI size selected at the $m^{th}$ time is one of the (N−m+1) DCI sizes that are not selected before the $m^{th}$ selection;

the DCI size selected at the $m^{th}$ time allows a sum of overheads of all DCI sizes in a DCI size set including DCI sizes selected at first m times to be a smallest value of sums of DCI size overheads of all the DCI sizes separately included in (N−m+1) DCI size sets that are formed during the $m^{th}$ selection and that are formed by using each of the (N−m+1) DCI sizes as a DCI size selected at the $m^{th}$ time; and a DCI size overhead in a DCI size set is a smallest value of differences between a DCI size in the DCI size set and (N−m) DCI sizes that are in the N types of DCI sizes and that are other than m DCI sizes included in the DCI size set.

Another manner is as follows:

That the terminal device determines Q types of DCI sizes includes: determining the Q types of DCI sizes based on (N−Q) iterations. For an $n^{th}$ iteration, a sequence that is of m types of DCI sizes sorted in ascending order and that is obtained in an $(n-1)^{th}$ iteration is $a_1$, $a_2$, ... $a_m$, where n is greater than or equal to 2 and less than or equal to N−Q−1, and a value of m is N−n+1. First coefficients of the DCI sizes $a_1$, $a_2$, ... $a_m$ are respectively $p_1$, $p_2$, ... $p_{m-1}$, $p_m$, and second coefficients of DCI sizes $a_1$, $a_2$, ... $a_m$ are respectively $k_1$, $k_2$, ... $k_{n-1}$. For the second coefficient $k_i$, $k_i$=$a_{i+1}$−$a_i$, i is greater than or equal to 1 and less than or equal to m−1. The terminal device selects the DCI size $a_i$ from the sequence $a_1$, $a_2$, ... $a_m$ based on a minimum value $k_i p_i$ in a sequence $k_1 p_1$, $k_2 p_2$, ... $k_{m-1} p_{m-1}$ and the corresponding DCI size $a_i$. For an $(n+1)^{th}$ iteration, obtained (m−1) types of DCI sizes do not include $a_i$, and a sequence of (m−1) types of DCI sizes sorted in ascending order is: $a_1$, $a_2$, ..., $a_{i-1}$, $a_{i+1}$, ..., $a_m$, where a second coefficient of $a_{i-1}$ is $k_{i+1}$+$k_i$, and a second coefficient of another element in the sequence is the same as that in the $n^{th}$ iteration. The first coefficient of $a_{i+1}$ is $p_{i+1}$+$p_i$, and the first coefficient of another element in the sequence is the same as that in the $n^{th}$ iteration. The Q types of DCI sizes are obtained in an $(N-Q)^{th}$ iteration.

For a first iteration, a sequence of the N types of DCI sizes in ascending order of DCI sizes is $a_1$, $a_2$, ... $a_n$. The terminal device determines, based on the configuration information, a quantity of DCI sizes corresponding to DCI sizes, and uses a value of the quantity of the DCI sizes as a first coefficient of the DCI size.

Specifically, when the network device determines differences $k_1$, $k_2$, ... $k_{n-1}$, and determines, based on the quantity of each type of DCI size $p_1$, $p_2$, ... $p_{n-1}$, $p_n$ on the CC, that each type of DCI size is aligned to the adjacent DCI sizes, a sequence of a quantity of bits that need to be padded is $k_1 p_1$, $k_2 p_2$, ... $k_{n-1} p_{n-1}$ as shown in FIG. 5, (that $p_1$, $p_2$, ... $p_{n-1}$, $p_n$ are 1 is used as an example).

A parameter C=N−Q is set, and the network device finds out a minimum value from the sequence of the quantity of bits that need to be padded, and aligns a corresponding DCI size to an adjacent DCI size.

For example, if a DCI size being $a_m$ is aligned to a DCI size being $a_{m+1}$, a quantity of DCI sizes whose DCI size is $a_{m+1}$ changes to $p_{m+1}$+$p_m$. In this case, if the DCI size being $a_{m+1}$ needs to be aligned to a DCI size being $a_{m+2}$, a quantity of bits that need to be padded is $(p_{m+1}+p_m) \cdot k_{m+1}$. However, if a DCI size being $a_{m-1}$ needs to be aligned to the DCI size being $a_{m+1}$, a quantity of bits that need to be padded is $p_{m-1}(k_{m-1}+k_m)$.

After the DCI sizes are aligned once, the remaining (n−1) types of DCI sizes are re-sorted in ascending order. In this case, $a_{m-1}$ and $a_{m+1}$ are adjacent, and a difference between the DCI sizes thereof is $k_{m-1}+k_m$. In addition, according to the foregoing method, a quantity of bits that need to be padded when each type of DCI size is aligned to an adjacent DCI size is determined, a minimum value is found out again, and then two types of adjacent DCI sizes are aligned, and so on. Each time two types of adjacent DCI sizes are aligned, 1 is subtracted from the value of C until C=0, to complete alignment of (N−Q) types of DCI sizes.

As shown in FIG. 5, the first alignment is to align $a_2$ obtained after $k_2$ bits are padded to $a_3$. In this case, after the first alignment is completed, there are two DCI sizes whose DCI sizes each are $a_3$ (considering that there is only one type of DCI size before the first alignment). The second alignment is to align $a_{n-2}$ obtained after $k_{n-2}$ bits are padded to $a_{n-1}$. In this case, after the second alignment is completed, there are two DCI sizes whose DCI sizes each are $a_{n-1}$.

If the third alignment is to align $a_3$ to $a_4$, and a difference between DCI sizes of $a_3$ and $a_4$ before the first alignment is $k_3$, $2*k_3$ bits need to be padded for the third alignment to align $a_3$ to $a_4$.

It should be understood that the method for aligning DCI sizes shown in FIG. 5 is an optimal alignment method provided in this embodiment of this application, so that a quantity of padded bits can be minimized, thereby reducing a waste of resources.

Figure 6:
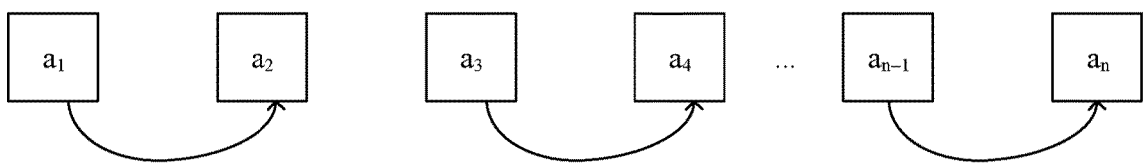
FIG. 6 is another schematic diagram of aligning DCI sizes according to an embodiment of this application.

It should be understood that (N−Q) types of DCI sizes are aligned based on a difference between DCI sizes of two types of adjacent DCI sizes. Alternatively, the N types of DCI sizes may be sorted based on only DCI sizes, and the two types of adjacent DCI sizes are directly aligned based on the difference between the DCI sizes of the two types of adjacent DCI sizes, and the alignment is performed for (N−Q) times, so that Q types of DCI sizes can be obtained. As shown in FIG. 6.

FIG. 6 is another schematic diagram of aligning DCI sizes according to an embodiment of this application. DCI sizes $a_1, a_2, \ldots a_n$ are included in the figure, where a curve between every two types of DCI sizes indicates that a DCI size is aligned to a DCI size indicated by a curve arrow.

However, in the alignment manner shown in FIG. 6, a quantity of bits that need to be padded may be greater than that shown in FIG. 5, because two types of adjacent DCI sizes with a smallest difference are not considered to be selected for alignment in an alignment process.

Optionally, in some other embodiments, the network device pads a quantity of bits to a DCI size in the N types of DCI sizes based on a DCI size in the Q types of DCI sizes, so that the Q types of DCI sizes are obtained after the N types of DCI sizes are padded by the quantity of bits, where the Q types of DCI sizes are predefined.

Figure 7:
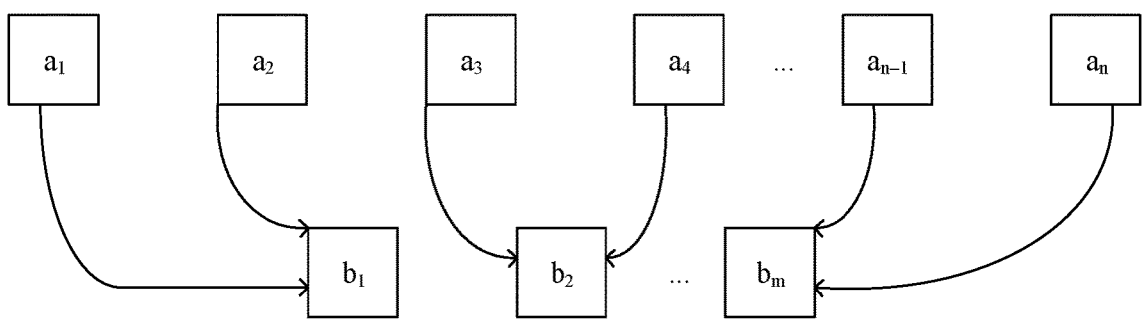
FIG. 7 is another schematic diagram of aligning DCI sizes according to an embodiment of this application.

With reference to FIG. 7, the following describes in detail how to align DCI sizes based on the predefined Q types of DCI sizes.

FIG. 7 is another schematic diagram of aligning DCI sizes according to an embodiment of this application. DCI sizes $a_1, a_2, \ldots a_n$ and predefined Q types of DCI sizes $b_1, b_2, \ldots b_m$ are included in the figure, where a curve between every two types of DCI sizes indicates that a DCI size is aligned to a DCI size indicated by a curve arrow.

For example, $N_{max}-X-(n1+n2)<0$, an alignment sequence $b_1, b_2, \ldots b_m$ of a DCI size is selected, and each different DCI size in the DCI format 1_1 and/or the DCI format 1_0 is aligned to a value that is closest to the DCI size in the alignment sequence and that is not less than the DCI size, where $m=N_{max}-X$. As shown in FIG. 7, possible values of the alignment sequence $b_1, b_2, \ldots b_m$ are in an arithmetic progression, $a_1=b_1$, and $b_{i+1}-b_1=\lceil a_n-a_1 \rceil/(m-1)$.

It should be understood that the foregoing alignment sequence may be predefined, or may be determined based on a largest value and/or a smallest value of the N types of DCI sizes.

It should be understood that, to ensure that all the N types of DCI sizes can be aligned, optionally, in the determined Q types of DCI sizes, the Q types of DCI sizes should include a DCI size with a largest DCI size in the N types of DCI sizes. In this way, it can be ensured that all the N types of DCI sizes can be aligned to the Q types of DCI sizes.

When the preset Q types of DCI sizes do not include the DCI size with the largest DCI size in the N types of DCI sizes, other DCI sizes other than the DCI size with the largest DCI size in the N types of DCI sizes should be aligned to obtain (Q−1) types of DCI sizes. In this way, the DCI size with the largest DCI size in the N types of DCI sizes may be determined as the $Q^{th}$ type of DCI size, so that it can be ensured that the Q types of DCI sizes are obtained after alignment is completed.

Optionally, the communication method provided in this embodiment of this application may further include the following steps.

S340: Send indication information.

The network device sends the indication information to the terminal device, to indicate how the terminal device determines the Q types of DCI sizes, or indicate the terminal device to determine the search space.

It should be understood that the indication information may not be sent. In other words, the terminal device and the network device may pre-agree on a manner of determining the Q types of DCI sizes.

S350: The terminal device determines the Q types of DCI sizes, and detects the downlink control channel based on the Q types of DCI sizes.

If N is greater than the first threshold, the terminal device determines the Q types of DCI sizes, where Q is less than or equal to the first threshold. The terminal device detects the downlink control channel in the first time unit based on the Q types of DCI sizes.

The first threshold is a maximum quantity $N_{max}$ of different DCI sizes that can be detected by the terminal device on the M component carriers. One component carrier may be a component carrier on which cross-component-carrier scheduling is configured.

It should be understood that a value of $N_{max}$ may be preset by a system, or may be configured by using the higher layer signaling, or may be determined based on a capability of reporting by the terminal device.

For example, N includes n1, n2, and X, and the first threshold is $N_{max}$. That the terminal device determines that N is greater than the first threshold includes:

calculating, by the terminal device, a value of $N_{max}-X-(n1+n2)$, and if $N_{max}-X-(n1+n2) \geq 0$, it is determined that N is less than or equal to the first threshold. The terminal device detects, on the scheduled component carrier, the DCI formats 0_1 corresponding to all the scheduled DL CCs and the DCI formats 1_1 corresponding to the UL CCs.

If $N_{max}-X-(n1+n2)<0$, the terminal device determines that N is greater than the first threshold.

When N is greater than the first threshold, the terminal device determines the Q types of DCI sizes.

Optionally, in some embodiments, the terminal device determines the Q types of DCI sizes from the N types of DCI sizes, where the N types of DCI sizes correspond to M component carriers, and component carriers corresponding to the Q types of DCI sizes are a portion of the M component carriers.

Optionally, in some embodiments, the terminal device sequentially removes (N−Q) types of DCI sizes from the N types of DCI sizes, where the DCI size selected at an $m^{th}$ time meets that: the DCI size selected at the $m^{th}$ time is one of the (N−m+1) DCI sizes that are not selected before the $m^{th}$ selection; the DCI size selected at the $m^{th}$ time allows a sum of overheads of all DCI sizes in a DCI size set including DCI sizes selected at first m times to be a smallest value of sums of DCI size overheads of all the DCI sizes separately included in (N−m+1) DCI size sets that are formed during the $m^{th}$ selection and that are formed by using each of the (N−m+1) DCI sizes as a DCI size selected at the $m^t$ time; and a DCI size overhead in a DCI size set is a smallest value of differences between a DCI size in the DCI size set and (N−m) DCI sizes that are in the N types of DCI sizes and that are other than m DCI sizes included in the DCI size set.

The Q types of DCI sizes are determined from the N types of DCI sizes, and the downlink control channel is detected based on the Q types of DCI sizes. Specifically, the following several specific solutions are included:

Solution 1: When N is greater than the first threshold, the terminal device determines the Q types of DCI sizes from the N types of DCI sizes, where the N types of DCI sizes correspond to M component carriers, and component carriers corresponding to the Q types of DCI sizes are a portion of the M component carriers.

The terminal device detects the downlink control channel in search spaces of the portion of the M component carriers, where the search spaces are determined based on carrier numbers of the portion of the M component carriers and a search space set configured for the portion of the M component carriers.

To describe the solution 1 in detail, the following uses an example in which Q=first threshold=$N_{max}$, and N includes n1, n2, and X, to describe how the terminal device determines the Q types of DCI sizes and detects the downlink control channel based on the Q types of DCI sizes.

The terminal device determines the Q types of DCI sizes from the N types of DCI sizes, where the N types of DCI sizes correspond to the M component carriers, and carriers corresponding to the Q types of DCI sizes are a portion of the M component carriers.

For example, the terminal device first calculates that detection of W=X+(n1+n2)−$N_{max}$ types of different DCI sizes needs to be reduced.

Optionally, DCI formats corresponding to the W types of DCI sizes include the DCI formats 0_1 and/or the DCI formats 1_1.

It should be understood that the DCI formats corresponding to the W types of DCI sizes limited above include the DCI formats 0_1 and/or the DCI formats 1_1, and do not include another DCI format, which is merely an example form, the DCI formats corresponding to the W types of DCI sizes may include another DCI format other than the DCI formats 0_1 and the DCI formats 1_1.

In the foregoing example, it is mainly considered that N may not include X, or X may be a relatively small value, or usually, DCI sizes of X types of DCI sizes cannot be changed.

Before determining the Q types of DCI sizes, the terminal device may first determine DCI formats corresponding to the Q types of DCI sizes.

For example, the terminal device selects, from DL CCs whose numbers are $d_1, d_2 \ldots d_{N1}$, first (or last, or random) p1 numbered DL CCs, and DCI formats 1_1 corresponding to the p1 DL CCs have a total of Q1 types of different DCI sizes.

Q1 may be equal to $n1-\lceil n1/(n1+n2) \cdot W \rceil$, and/or the terminal device selects, from UL CCs whose numbers are $u_1, u_2 \ldots u_{N2}$, first (or last, or random) p2 numbered UL CCs, and DCI formats 0_1 corresponding to the p2 UL CCs have a total of Q2 types of different DCI sizes.

Q2 may be equal to $n2-(W-\lceil n1/(n1+n2) \cdot W \rceil)$.

After the DCI format 1_1 and/or the DCI format 0_1 are/is determined, the Q types of DCI sizes may be determined based on the Q1 and the Q2.

Optionally, in some embodiments, the Q types of DCI sizes are the Q1 types of DCI sizes.

Optionally, in some other embodiments, the Q types of DCI sizes are the Q2 types of DCI sizes.

Optionally, in some other embodiments, the Q types of DCI sizes are a sum of the Q1 types of DCI sizes and the Q2 types of DCI sizes.

It should be understood that when the value of X is not equal to 0, a value of X needs to be considered.

Optionally, in some embodiments, (Q−X) types of DCI sizes are the Q1 types of DCI sizes.

Optionally, in some other embodiments, (Q−X) types of DCI sizes are the Q2 types of DCI sizes.

Optionally, in some other embodiments, (Q−X) types of DCI sizes are a sum of the Q1 types of DCI sizes and the Q2 types of DCI sizes.

Further, the terminal device determines a search space set S1 of the DCI formats 1_1 that correspond to the p1 DL CCs and that are in the CC that supports cross-component-carrier scheduling. In addition, the terminal device determines a search space set S2 of the DCI formats 0_1 that correspond to the p2 UL CCs and that are in the CC that supports cross-component-carrier scheduling.

The terminal device detects the corresponding DCI formats 0_1 and DCI formats 1_1 only in the search space sets S1 and S2 in the component carrier.

For ease of understanding the solution 1, the following uses an example in which a quantity of DL CCs that can be scheduled on the component carrier is N1=3, and numbers of the DL CCs sorted in ascending order are $d_1, d_2, d_3$. The scheduled DL CCs have a total of two types of DCI formats 1_1 with different DCI sizes: "1" and "11", where $d_1$ and $d_2$ correspond to "1", and $d_3$ corresponds to "11".

A quantity of UL CCs that can be scheduled on the CC is N2=3, and numbers of the UL CCs sorted in ascending order are $u_1, u_2, u_3$. The scheduled UL CCs have a total of two types of DCI formats 0_1 with different DCI sizes: "111" and "1111", where $u_1$ and $u_2$ correspond to "111", and $u_3$ corresponds to "1111".

The following uses $N_{max}$=4 and X=2 as an example to describe the calculation process.

W=2 is obtained through a calculation formula: W=X+(n1+n2)−$N_{max}$.

The first two numbered DL CCs are selected from the DL CCs whose numbers are $d_1, d_2, d_3$, and the DCI formats 1_1 corresponding to the two DL CCs have one type of different DCI size in total.

The first two numbered UL CCs are selected from the UL CCs whose numbers are $u_1, u_2, u_3$, and the DCI formats 0_1 corresponding to the two UL CCs have one type of different DCI size in total.

The terminal device determines a search space set S1 of the DCI formats 1_1 that correspond to the 2 DL CCs and that are in the CC that supports the cross-component-carrier scheduling. In addition, the terminal device determines a search space set S2 of the DCI formats 0_1 that correspond to the 2 UL CCs and that are in the CC that supports the cross-component-carrier scheduling.

The terminal device detects the corresponding DCI formats 0_1 and DCI formats 1_1 only in the search space sets S1 and S2 in the CC that supports the cross-component-carrier scheduling.

It should be understood that the value of X may be 0 or another value. X=2 is merely an example, and cannot limit the protection scope of this application.

According to the solution 1, it can be met that a quantity of different DCI sizes detected by the terminal device on the CC does not exceed a maximum value, and a quantity of different DCI sizes finally detected by the terminal device is a preset maximum value, thereby fully using a capability of detecting a DCI size by the terminal device.

Solution 2: When N is greater than the first threshold, the terminal device detects, based on a DCI size $a_2$ the downlink control channel in a search space of a component carrier corresponding to a DCI size $a_1$. The DCI size $a_1$ is one of the N types of DCI sizes, and the DCI size $a_2$ is in the Q types of DCI sizes, is greater than or equal to $a_1$, and has a smallest difference from $a_1$.

That the terminal device detects the downlink control channel in the first time unit includes: detecting, by the terminal device, the downlink control channel in search spaces of the M component carriers based on the Q types of DCI sizes.

In the solution, the terminal device detects, based on the determined Q types of DCI sizes, the search spaces corresponding to the M component carriers corresponding to the N types of DCI sizes. In other words, the detection of the downlink control channel in the search spaces of the component carriers is not reduced. However, in the solution 1, only search spaces corresponding to portion of the M component carriers are detected.

Optionally, in some embodiments, that the terminal device detects the downlink control channel in the first time unit further includes: detecting, by the terminal device based on a DCI size $a_2$, the downlink control channel in a search space of a component carrier corresponding to a DCI size $a_1$, where the DCI size $a_1$ is one of the N types of DCI sizes, other than the Q types of DCI sizes, and the DCI size $a_2$ is in the Q types of DCI sizes, is greater than or equal to $a_1$, and has a smallest difference from $a_1$. Optionally, in an embodiment, the Q types of DCI sizes are Q types of DCI sizes with largest values of DCI sizes in the N types of DCI sizes.

When the Q types of DCI sizes are the Q types of DCI sizes determined by using the alignment method shown in FIG. 4, that the terminal device detects the downlink control channel in the first time unit includes: detecting, based on a DCI size $a_{N-Q+1}, \ldots a_n$, the downlink control channel in a search space of a component carrier corresponding to a DCI size $a_1$.

Specifically, the terminal device detects, on the CC, a DCI format 0_1 and a DCI format 1_1 whose DCI sizes are $a_{N-Q+1}, \ldots a_n$.

When the Q types of DCI sizes are the Q types of DCI sizes determined by using the alignment method shown in FIG. 5, FIG. 6, or FIG. 7, that the terminal device detects the downlink control channel in the first time unit includes: detecting, based on a determined DCI size, the downlink control channel in a search space of a component carrier corresponding to a DCI size.

The terminal device detects the downlink control channel in search spaces of the M component carriers based on a DCI size in the Q types of DCI sizes.

The communication method in the embodiments of this application is mainly described in FIG. 3 to FIG. 7. The following describes a terminal device and a network device in the embodiments of this application with reference to FIG. 8 to FIG. 11.

Figure 8:
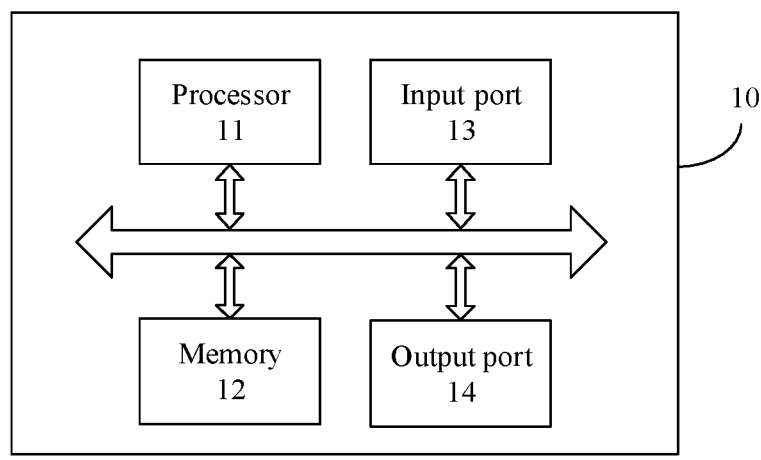
FIG. 8 is a schematic block diagram of an example of a terminal device according to this application.

FIG. 8 is a schematic diagram of a communications apparatus 10 according to an embodiment of this application. As shown in FIG. 8, the communications apparatus 8 may be a terminal device (for example, the terminal device #A), or may be a chip or a circuit, for example, a chip or a circuit that may be disposed in a terminal device. The terminal device may correspond to the terminal device in the foregoing method.

The communications apparatus 10 may include a processor 11 (that is, an example of a processing unit) and a memory 12. The memory 12 is configured to store an instruction, and the processor 11 is configured to execute the instruction stored in the memory 12, so that the apparatus 10 implements the steps performed by the terminal device (for example, the terminal device #A) in the corresponding method in FIG. 3 to FIG. 7.

Further, the communications apparatus 10 may further include an input port 13 (that is, an example of a communications unit) and an output port 14 (that is, another example of a communications unit). Further, the processor 11, the memory 12, the input port 13, and the output port 14 may communicate with each other by using an internal connection path, to transfer a control and/or data signal. The memory 12 is configured to store a computer program. The processor 11 may be configured to invoke the computer program from the memory 12 and run the computer program, to control the input port 13 to receive a signal and control the output port 14 to send a signal, thereby completing the steps performed by the terminal device in the foregoing method. The memory 12 may be integrated into the processor 11, or may be disposed separated from the processor 11.

Optionally, if communications the apparatus 10 is the terminal device, the input port 13 is a receiver, and the output port 14 is a transmitter, the receiver and the transmitter may be a same physical entity or different physical entities. When the receiver and the transmitter are the same physical entity, the receiver and the transmitter may be collectively referred to as a transceiver.

Optionally, if the communications apparatus 10 is the chip or the circuit, the input port 13 is an input interface, and the output port 14 is an output interface, in an implementation, it may be considered that functions of the input port 13 and the output port 14 are implemented by using a transceiver circuit or a dedicated transceiver chip. It may be considered that the processor 11 is implemented by using a dedicated processing chip, a processing circuit, or a processor, or a general-purpose chip.

In another implementation, it may be considered that the terminal device provided in this embodiment of this application is implemented by using a general-purpose computer. To be specific, program code that implements functions of the processor 11, the input port 13, and the output port 14 is stored in the memory 12, and a general-purpose processor executes the code in the memory 12, to implement the functions of the processor 11, the input port 13, and the output port 14.

For concepts, explanations, detailed descriptions, and other steps of the apparatus 10 that are related to the technical solutions provided in the embodiments of this application, refer to the descriptions of the content in the foregoing methods or other embodiments. Details are limited described herein again.

Figure 9:
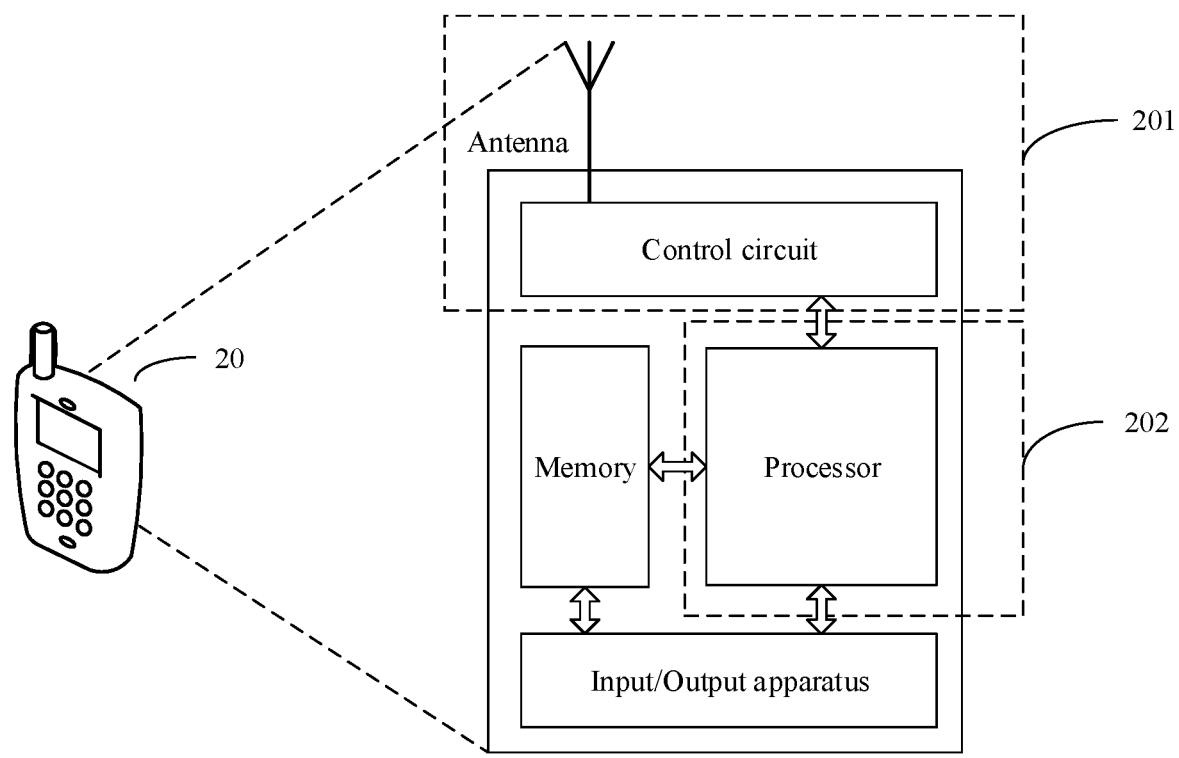
FIG. 9 is a schematic block diagram of another example of a terminal device according to this application.

FIG. 9 is a schematic structural diagram of a terminal device 20 according to this application. For ease of description, FIG. 9 shows only main components of the terminal device. As shown in FIG. 9, the terminal device 20 includes a processor, a memory, a control circuit, an antenna, and an input/output apparatus.

The processor is mainly configured to: process a communications protocol and communications data, control the entire terminal device, execute a software program, and process data of the software program, for example, is configured to support the terminal device in performing the action described in the foregoing embodiments of the method for transmitting a precoding matrix indicator. The memory is mainly configured to store a software program and data, for example, store the codebook described in the foregoing embodiment. The control circuit is mainly configured to: convert a baseband signal and a radio frequency signal, and process the radio frequency signal. The control circuit together with the antenna may also be referred to as a transceiver, and is mainly configured to receive and send a radio frequency signal in an electromagnetic wave form. The input/output apparatus, such as a touchscreen, a display screen, or a keyboard, is mainly configured to receive data input by a user and output data to the user.

After the terminal device is powered on, the processor may read a software program in the storage unit, interpret and execute an instruction of the software program, and process data of the software program. When data needs to be sent in a wireless manner, the processor performs baseband processing on to-be-sent data, and then outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communication protocol and communication data, and the central processing unit is mainly configured to: control the entire terminal device, execute a software program, and process data of the software program. Functions of the baseband processor and the central processing unit are integrated into the processor in FIG. 9. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a software program form. The processor executes the software program to implement a baseband processing function.

For example, in this embodiment of this application, the antenna and the control circuit that have sending and receiving functions may be considered as a transceiver unit 201 of the terminal device 20, and the processor having a processing function may be considered as a processing unit 202 of the terminal device 20. As shown in FIG. 9, the terminal device 20 includes a transceiver unit 201 and a processing unit 202. The transceiver unit may also be referred to as a transceiver, a transceiver, a transceiver apparatus, or the like. Optionally, a component for implementing a receiving function in the transceiver unit 201 may be considered as a receiving unit, and a component for implementing a sending function in the transceiver unit 201 may be considered as a sending unit. That is, the transceiver unit 201 includes the receiving unit and the sending unit. For example, the receiving unit may also be referred to as a receiver, a receiver circuit, or the like. The sending unit may be referred to as a transmitter, a transmitter, a transmitter circuit, or the like.

Figure 10:
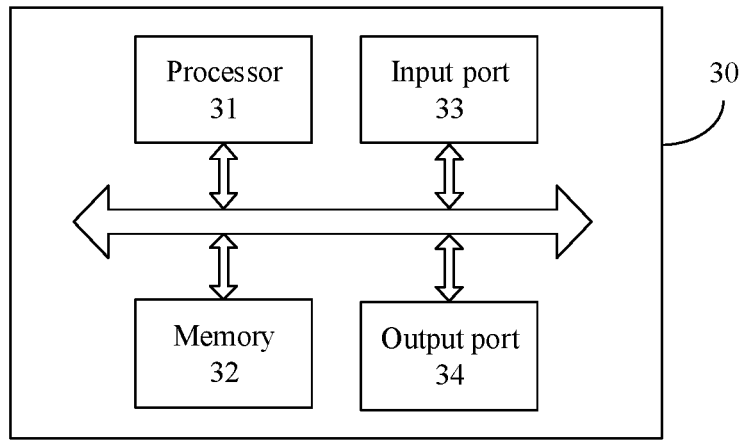
FIG. 10 is a schematic block diagram of an example of a network device according to this application.

According to the foregoing method, FIG. 10 is a schematic diagram of a communications apparatus 30 according to an embodiment of this application. As shown in FIG. 10, the apparatus 30 may be a network device (for example, the network device #A or the network device #1), or may be a chip or a circuit, for example, a chip or a circuit that may be disposed in a network device. The network device corresponds to the network device (for example, the network device #A or the network device #1) in the foregoing method.

The apparatus 30 may include a processor 31 (that is, an example of a processing unit) and a memory 32. The memory 32 is configured to store an instruction, and the processor 31 is configured to execute the instruction stored in the memory 32, so that the apparatus 30 implements the steps performed by the network device (for example, the network device #A and the network device #1) in the foregoing method.

Further, the apparatus 30 may further include an input port 33 (that is, an example of a communications unit) and an output port 33 (that is, another example of a communications unit).

Still further, the processor 31, the memory 32, the input port 33, and the output port 34 may communicate with each other by using an internal connection path, to transfer a control and/or data signal.

In another implementation, it may be considered that the network device provided in this embodiment of this application is implemented by using a general-purpose computer. To be specific, program code that implements functions of the processor 31, the input port 33, and the output port 34 is stored in the memory, and a general-purpose processor executes the code in the memory, to implement the functions of the processor 31, the input port 33, and the output port 34.

The memory 32 is configured to store a computer program.

For concepts, explanations, detailed descriptions, and other steps of the apparatus 30 that are related to the technical solutions provided in the embodiments of this application, refer to the descriptions of the content in the foregoing methods or other embodiments. Details are limited described herein again.

Figure 11:
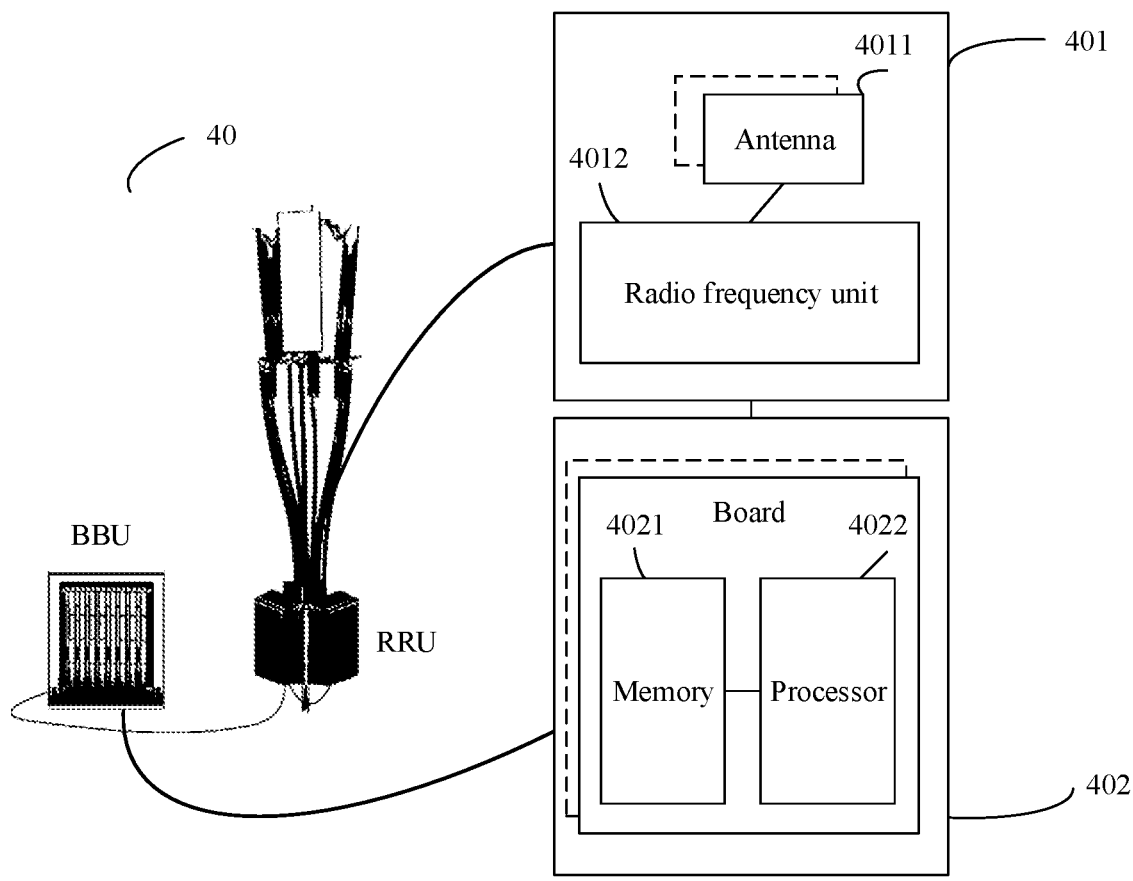
FIG. 11 is a schematic block diagram of another example of a network device according to this application.

FIG. 11 is a schematic structural diagram of a network device 40 according to an embodiment of this application. The network device 40 may be configured to implement the functions of the network device (for example, the network device #A) in the foregoing method. The network device 40 includes one or more radio frequency units, such as a remote radio unit (RRU) 401 and one or more baseband units (BBU) (which may also be referred to as a digital unit, digital unit, DU) 402. The RRU 401 may be referred to as a transceiver unit, a transceiver, a transceiver circuit, a transceiver, or the like, and may include at least one antenna 4011 and a radio frequency unit 4012. The RRU 401 part is mainly configured to perform sending and receiving of a radio frequency signal and conversion between a radio frequency signal and a baseband signal, for example, configured to send the signaling message in the foregoing embodiments to a terminal device. The BBU 402 part is mainly configured to perform baseband processing, control the base station, and the like. The RRU 401 and the BBU 402 may be physically disposed together, or may be physically separated, that is, in a distributed base station.

The BBU 402 is a control center of the base station, may also be referred to as a processing unit, and is mainly configured to complete baseband processing functions such as channel coding, multiplexing, modulation, and spectrum spreading. For example, the BBU (the processing unit) 402 may be configured to control the base station 40 to execute an operation procedure related to the network device in the foregoing method embodiments.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store a necessary instruction and data. For example, the memory 4021 stores the codebook and the like in the foregoing embodiments. The processor 4022 is configured to control the base station to perform a necessary action, for example, is configured to control the base station to perform an operation procedure related to the network device in the foregoing method embodiments. The memory 4021 and the processor 4022 may serve the one or more boards. That is, the memory and processor can be separately set on each board. Alternatively, a plurality of boards may share a same memory and a same processor. In addition, a necessary circuit may be further disposed on each board.

In a possible implementation, with development of a system-on-chip (SoC) technology, all or some functions of the parts 402 and 401 may be implemented by using the SoC technology, for example, implemented by using one base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the network device shown in FIG. 11 is merely a possible form, but should not constitute any limitation to this embodiment of this application. This application does not exclude a possibility that there may be a base station structure in another form in the future.

According to the method provided in the embodiments of this application, an embodiment of this application further provides a communications system, where the communications system includes the foregoing network device and one or more terminal devices.

Another aspect of this application provides a computer-readable storage medium. The computer-readable storage medium stores an instruction; and when the instruction is run on a computer, the computer is enabled to perform the steps performed by the terminal device in the method shown in FIG. 3 to FIG. 7.

Another aspect of this application provides a computer-readable storage medium. The computer-readable storage medium stores an instruction; and when the instruction is run on a computer, the computer is enabled to perform the steps performed by the network device in the method shown in FIG. 3 to FIG. 7.

Another aspect of this application provides a computer program product including an instruction, and when the computer program product is run on a computer, the computer is enabled to perform the steps performed by the terminal device in the method shown in FIG. 3 to FIG. 7.

Another aspect of this application provides a computer program product including an instruction, and when the computer program product is run on a computer, the computer is enabled to perform the steps performed by the network device in the method shown in FIG. 3 to FIG. 7.

It should be understood that the processor in the embodiments of this application may be a central processing unit (CPU), or may be another general-purpose processor, a digital signal processor (DSP), an application-specific integrated circuit (ASIC), a field programmable gate array (FPGA) or another programmable logic device, discrete gate or transistor logic device, a discrete hardware component, or the like. The general-purpose processor may be a microprocessor, or the processor may be any conventional processor, or the like.

It should be further understood that, in the embodiments of this application, the memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of random access memories (RAM) may be used, for example, a static random access memory (SRAM), a dynamic random access memory (DRAM), a synchronous dynamic random access memory (SDRAM), a double data rate-synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by software, hardware, firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes various media that can store program code, for example, a USB flash drive, a removable hard disk, a read-only memory (ROM), a random access memory (RAM), a magnetic disk, and an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a terminal device, configuration information of M component carriers, wherein M is a positive integer;
determining, by the terminal device, N types of downlink control information (DCI) sizes based on the configuration information, wherein N is a positive integer; and
based on N being greater than a first threshold, determining, by the terminal device, Q types of DCI sizes, and
detecting, by the terminal device, a downlink control channel based on the Q types of DCI sizes, wherein Q is a positive integer and Q is less than or equal to the first threshold.

2. The communication method according to claim 1, wherein the determining of the Q types of DCI sizes comprises:
determining, by the terminal device, the Q types of DCI sizes from the N types of DCI sizes.

3. The communication method according to claim 1, wherein the detecting of the downlink control channel comprises:
detecting, by the terminal device, the downlink control channel in search spaces of the M component carriers based on the Q types of DCI sizes.

4. The communication method according to claim 1, wherein DCI sizes of the M component carriers are the N types of DCI sizes.

5. The communication method according to claim 1, wherein DCI sizes of a portion of the M component carriers are the Q types of DCI sizes.

6. A communication method, comprising:
determining, by a network device, configuration information of M component carriers, wherein downlink control information (DCI) sizes of the M component carriers are of N different types, M is a positive integer, and N is greater than a first threshold;

sending, by the network device, the configuration information to a terminal device; and sending, by the network device, a downlink control channel based on Q types of DCI sizes, wherein Q is a positive integer, and Q is less than or equal to the first threshold.

7. The communication method according to claim 6, wherein the Q types of DCI sizes are included in the N types of DCI sizes.

8. The communication method according to claim 6, wherein the sending of the downlink control channel comprises:

sending, by the network device based on the Q types of DCI sizes, the downlink control channel on resources corresponding to search spaces of the M component carriers.

9. The communication method according to claim 6, wherein DCI sizes of a portion of the M component carriers are the Q types of DCI sizes.

10. A communication device, comprising:

a memory storing executable instructions; and a processor configured to execute the executable instructions to perform operations comprising:

receiving configuration information of M component carriers, wherein M is a positive integer;

determining N types of downlink control information (DCI) sizes based on the configuration information, wherein N is a positive integer; and based on N being greater than a first threshold, determining Q types of DCI sizes, and detecting a downlink control channel based on the Q types of DCI sizes, wherein Q is a positive integer and Q is less than or equal to the first threshold.

11. The communication device according to claim 10, wherein the determining of the Q types of DCI sizes comprises:

determining the Q types of DCI sizes from the N types of DCI sizes.

12. The communication device according to claim 10, wherein the detecting of the downlink control channel comprises:

detecting the downlink control channel in search spaces of the M component carriers based on the Q types of DCI sizes.

13. The communication device according to claim 10, wherein DCI sizes of the M component carriers are the N types of DCI sizes.

14. The communication device according to claim 10, wherein DCI sizes of a portion of the M component carriers are the Q types of DCI sizes.

15. The communication device according to claim 10, wherein the communication device is a terminal device or a chip in a terminal device.

16. A communication device, comprising:

a memory storing executable instructions; and a processor configured to execute the executable instructions to perform operations comprising:

determining configuration information of M component carriers, wherein downlink control information (DCI) sizes of the M component carriers are of N different types, M is a positive integer, N is a positive integer, and N is greater than a first threshold;

sending the configuration information; and sending a downlink control channel based on Q types of DCI sizes, wherein Q is a positive integer, and Q is less than or equal to the first threshold.

17. The communication device according to claim 16, wherein the Q types of DCI sizes are included in the N types of DCI sizes.

18. The communication device according to claim 16, wherein the sending of the downlink control channel comprises:

sending, based on the Q types of DCI sizes, the downlink control channel on resources corresponding to search spaces of the M component carriers.

19. The communication device according to claim 16, wherein DCI sizes of a portion of the M component carriers are the Q types of DCI sizes.

20. The communication device according to claim 16, wherein the communication device is a network device or a chip in a network device.

* * * * *

UNITED STATES PATENT AND TRADEMARK OFFICE
CERTIFICATE OF CORRECTION

PATENT NO. : 11,695,500 B2
APPLICATION NO. : 17/094821
DATED : July 4, 2023
INVENTOR(S) : Zheng Chen It is certified that error appears in the above-identified patent and that said Letters Patent is hereby corrected as shown below:

In the Claims

Column 39, Claim 6, Line 2, insert --N is a positive integer,-- before "and N is greater than a first threshold;".

Signed and Sealed this
First Day of August, 2023

Katherine Kelly Vidal
*Director of the United States Patent and Trademark Office*